United States Patent
Mossoba et al.

(10) Patent No.: US 10,796,380 B1
(45) Date of Patent: Oct. 6, 2020

(54) EMPLOYMENT STATUS DETECTION BASED ON TRANSACTION INFORMATION

(71) Applicant: Capital One Services, LLC, McLean, VA (US)

(72) Inventors: Michael Mossoba, Arlington, VA (US); Abdelkader M'Hamed Benkreira, New York, NY (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/777,148

(22) Filed: Jan. 30, 2020

(51) Int. Cl.
| | |
|---|---|
| *G06Q 40/00* | (2012.01) |
| *G06Q 40/02* | (2012.01) |
| *G06Q 50/22* | (2018.01) |
| *G06F 21/62* | (2013.01) |
| *G06N 20/00* | (2019.01) |
| *G06Q 50/26* | (2012.01) |
| *G06Q 10/10* | (2012.01) |

(52) U.S. Cl.
CPC ......... *G06Q 40/12* (2013.12); *G06F 21/6218* (2013.01); *G06N 20/00* (2019.01); *G06Q 40/02* (2013.01); *G06Q 50/22* (2013.01); *G06Q 50/26* (2013.01); *G06Q 10/105* (2013.01)

(58) Field of Classification Search
CPC ........ G06Q 40/12; G06Q 50/22; G06Q 50/26; G06Q 40/02; G06Q 10/105; G06F 21/6218; G06N 20/00
See application file for complete search history.

(56) References Cited

U.S. PATENT DOCUMENTS

| | | | | |
|---|---|---|---|---|
| 7,797,166 B1 * | 9/2010 | Bradley | ............... | G06Q 40/00 705/1.1 |
| 7,809,622 B1 * | 10/2010 | Fitch | .................... | G06Q 10/10 705/35 |

(Continued)

OTHER PUBLICATIONS

A. Sandybayev, "Artificial Intelligence: Are We All Going to Be Unemployed?," 2018 Fifth HCT Information Technology Trends (ITT), Dubai, United Arab Emirates, 2018, pp. 23-27, doi: 10.1109/CTIT.2018.8649521. (Year: 2018).*

(Continued)

*Primary Examiner* — Ashford S Hayles
(74) *Attorney, Agent, or Firm* — Harrity & Harrity, LLP

(57) ABSTRACT

An income analysis platform may receive information associated with employment-related activity of a user, wherein the employment-related activity is associated with an employment status of the user. The income analysis platform may analyze, using an employment analysis model, the information to determine the employment status of the user. The income analysis platform may determine, based on the information and using the employment analysis model, that there is a change in the employment status of the user. The income analysis platform may identify, based on the determined change in the employment status of the user, a service associated with a transaction account of the user. The income analysis platform may determine, based on the change in the employment status, that one or more terms of the service are to be adjusted. The income analysis platform may perform an action associated with adjusting the one or more terms of the service.

20 Claims, 8 Drawing Sheets

(56) References Cited

U.S. PATENT DOCUMENTS

| | | | | |
|---|---|---|---|---|
| 7,954,698 B1* | 6/2011 | Pliha | G06Q 40/02 235/379 |
| 8,380,590 B1* | 2/2013 | Rukonic | G06Q 40/02 705/1.1 |
| 8,527,376 B1* | 9/2013 | Bueche, Jr. | G06Q 40/10 702/31 |
| 8,543,523 B1* | 9/2013 | Palit | G06Q 30/0201 706/12 |
| 8,583,471 B1* | 11/2013 | Voskuhl | G06Q 30/0254 705/14.53 |
| 8,606,603 B2 | 12/2013 | Annappindi | |
| 10,169,784 B1* | 1/2019 | Hildebrand | G06Q 40/02 |
| 10,346,869 B1* | 7/2019 | Ahmed | G06Q 30/0226 |
| 10,475,125 B1* | 11/2019 | Kumari | G06N 20/00 |
| 2004/0111370 A1* | 6/2004 | Saylors | G06Q 20/102 705/40 |
| 2005/0125259 A1* | 6/2005 | Annappindi | G06Q 40/08 705/4 |
| 2006/0143075 A1* | 6/2006 | Carr | G06Q 30/0202 705/14.35 |
| 2007/0055621 A1* | 3/2007 | Tischler | G06Q 40/02 705/38 |
| 2008/0262925 A1* | 10/2008 | Kim | G06Q 30/02 705/14.27 |
| 2008/0270292 A1* | 10/2008 | Ghosh | G06Q 40/00 705/38 |
| 2009/0012809 A1* | 1/2009 | Beckers | G06Q 10/10 705/320 |
| 2009/0276368 A1* | 11/2009 | Martin | G06Q 40/02 705/36 R |
| 2010/0169134 A1* | 7/2010 | Cheng | G06Q 10/06398 705/7.42 |
| 2011/0078073 A1* | 3/2011 | Annappindi | G06Q 40/025 705/38 |
| 2011/0093324 A1* | 4/2011 | Fordyce, III | G06Q 20/10 705/14.27 |
| 2011/0131130 A1* | 6/2011 | Griffin | G06Q 40/00 705/38 |
| 2011/0213697 A1* | 9/2011 | Dodini | G06Q 10/1057 705/35 |
| 2011/0295731 A1* | 12/2011 | Waldron | G06Q 10/0635 705/35 |
| 2011/0307374 A1* | 12/2011 | Grundner | G06Q 40/00 705/39 |
| 2012/0016817 A1* | 1/2012 | Smith | G06N 20/00 706/12 |
| 2012/0109802 A1* | 5/2012 | Griffin | G06Q 40/00 705/35 |
| 2012/0197666 A1 | 8/2012 | McDonald Meyer et al. | |
| 2013/0006845 A1* | 1/2013 | Kremen | G06Q 40/025 705/38 |
| 2013/0013489 A1* | 1/2013 | Kremen | G06Q 40/06 705/38 |
| 2013/0018776 A1* | 1/2013 | Xie | G06Q 40/02 705/38 |
| 2013/0054376 A1* | 2/2013 | Ross | G06Q 30/0251 705/14.66 |
| 2013/0085783 A1* | 4/2013 | Menz | G06Q 40/08 705/4 |
| 2013/0138554 A1* | 5/2013 | Nikankin | G06Q 40/02 705/38 |
| 2013/0151388 A1* | 6/2013 | Falkenborg | G06Q 40/10 705/35 |
| 2013/0204757 A1* | 8/2013 | Willard | G06Q 10/10 705/30 |
| 2013/0325679 A1* | 12/2013 | Yeri | G06Q 40/02 705/35 |
| 2013/0325698 A1* | 12/2013 | Shao | G06Q 40/02 705/39 |
| 2014/0052606 A1* | 2/2014 | Vasudevan | G06Q 40/025 705/38 |
| 2014/0180919 A1* | 6/2014 | Brown | G06Q 20/12 705/42 |
| 2014/0180974 A1* | 6/2014 | Kennel | G06Q 40/025 706/12 |
| 2014/0214670 A1* | 7/2014 | McKenna | G06Q 20/4014 705/44 |
| 2014/0278647 A1* | 9/2014 | Rameshkumar | G06Q 10/06313 705/7.15 |
| 2014/0377727 A1* | 12/2014 | Yom-Tov | G06F 19/00 434/236 |
| 2015/0019401 A1* | 1/2015 | Kollur | G06Q 40/025 705/38 |
| 2015/0095216 A1* | 4/2015 | Van Heerden | G06Q 30/00 705/39 |
| 2015/0134520 A1* | 5/2015 | Martin | G06Q 20/108 705/42 |
| 2015/0142595 A1* | 5/2015 | Acuna-Rohter | G06Q 20/202 705/21 |
| 2015/0206252 A1* | 7/2015 | Rephlo | G06Q 40/12 705/30 |
| 2015/0332303 A1* | 11/2015 | Kodali | G06Q 30/0226 705/14.25 |
| 2016/0019303 A1* | 1/2016 | Littleford | G06N 5/02 707/754 |
| 2016/0086263 A1* | 3/2016 | Weinflash | G06Q 40/025 705/38 |
| 2016/0162952 A1* | 6/2016 | Bedingfield, Sr. | G06Q 30/0269 705/14.66 |
| 2016/0232545 A1* | 8/2016 | Shuken | G06Q 30/0205 |
| 2016/0314528 A1* | 10/2016 | Abbott | G06Q 40/00 |
| 2017/0018028 A1* | 1/2017 | Gatz | G06Q 40/025 |
| 2017/0024701 A1* | 1/2017 | Tang | G06F 16/9535 |
| 2017/0116531 A1* | 4/2017 | Dorai | G06N 20/00 |
| 2017/0323272 A1* | 11/2017 | Dintenfass | G16H 40/63 |
| 2017/0323394 A1* | 11/2017 | Campione | G06Q 40/12 |
| 2017/0346823 A1* | 11/2017 | Wadley | H04W 12/08 |
| 2018/0039970 A1* | 2/2018 | Gorenstein | G06Q 20/4016 |
| 2018/0060843 A1* | 3/2018 | Maheshwari | G06Q 50/01 |
| 2018/0101568 A1* | 4/2018 | Jones-McFadden | G06Q 40/02 |
| 2018/0204280 A1* | 7/2018 | Painter | G06Q 40/08 |
| 2018/0233014 A1* | 8/2018 | Wilkinson | G08B 25/08 |
| 2019/0057334 A1* | 2/2019 | Schneider | G06Q 10/06311 |
| 2019/0171982 A1* | 6/2019 | Kirk | G06Q 10/067 |
| 2019/0180358 A1* | 6/2019 | Nandan | G06K 9/6219 |
| 2019/0294786 A1* | 9/2019 | Villavicencio | G06F 21/554 |
| 2019/0333140 A1* | 10/2019 | Sullivan | G06F 16/244 |
| 2020/0098467 A1* | 3/2020 | Chakra | G06F 16/955 |

OTHER PUBLICATIONS

Y. Zhang and T. Cheng, "A Deep Learning Approach to Infer Employment Status of Passengers by Using Smart Card Data," in IEEE Transactions on Intelligent Transportation Systems, vol. 21, No. 2, pp. 617-629, Feb. 2020, doi: 10.1109/TITS.2019.2896460. (Year: 2019).*

Llorente A, Garcia-Herranz M, Cebrian M, Moro E. Social media fingerprints of unemployment. PLoS One. 2015;10(5):e0128692. Published May 28, 2015. doi:10.1371/journal.pone.0128692 (Year: 2015).*

* cited by examiner

EMPLOYMENT STATUS DETECTION BASED ON TRANSACTION INFORMATION

BACKGROUND

Individuals generally receive income to manage, maintain, and/or improve a particular way of life. The income may be received in the form of currency, property, credit, and/or the like. Further, the income may be received as earnings from an employer (e.g., via a job or employment with the employer), as a dividend associated with being a shareholder of a business, as a benefit from a governmental entity (e.g., for unemployment, disability, and/or the like), as investment earnings (e.g., earnings associated with stock, stock options, bonds, mutual funds, and/or the like), and/or the like.

SUMMARY

According to some implementations, a method may include monitoring, based on receiving access information, a transaction log of a transaction account; detecting, from the transaction log, that an income transaction occurred, wherein the income transaction is associated with receiving income from an entity; determining that the entity is associated with a new source of income; determining, based on the entity being associated with a new source of income, a probability that the employment status of the user has changed; analyzing, based on the probability that the employment status has changed, employment-related activity associated with the user to determine whether the user is likely unemployed; determining, based on the employment-related activity, that the user is likely unemployed; and performing an action associated with a service of the transaction account in association with the user being likely unemployed.

According to some implementations, a device may include one or more memories; and one or more processors, communicatively coupled to the one or more memories, configured to: monitor a transaction log of a transaction account of a user; detect, from the transaction log, that an income transaction occurred, wherein the income transaction is associated with receiving income from an entity; determine that the entity is associated with providing unemployment income, wherein the entity is determined to be associated with providing unemployment income based on an identifier of the entity being included in the transaction log and a mapping of unemployment income sources; determine, based on the entity being associated with providing unemployment income, that the user is likely unemployed; and perform an action associated with a service of the transaction account in association with the user being determined to be likely unemployed.

According to some implementations, a non-transitory computer-readable medium may store one or more instructions. The one or more instructions, when executed by one or more processors of a device, may cause the one or more processors to: receive information associated with employment-related activity of a user, wherein the employment-related activity is associated with an employment status of the user; analyze, using an employment analysis model, the information to determine the employment status of the user; determine, based on the information and using the employment analysis model, that there is a change in the employment status of the user; identify, based on the determined change in the employment status of the user, a service associated with a transaction account of the user; determine, based on the change in the employment status, that one or more terms of the service are to be adjusted; and perform an action associated with adjusting the one or more terms of the service.

DETAILED DESCRIPTION

Figure 1A:
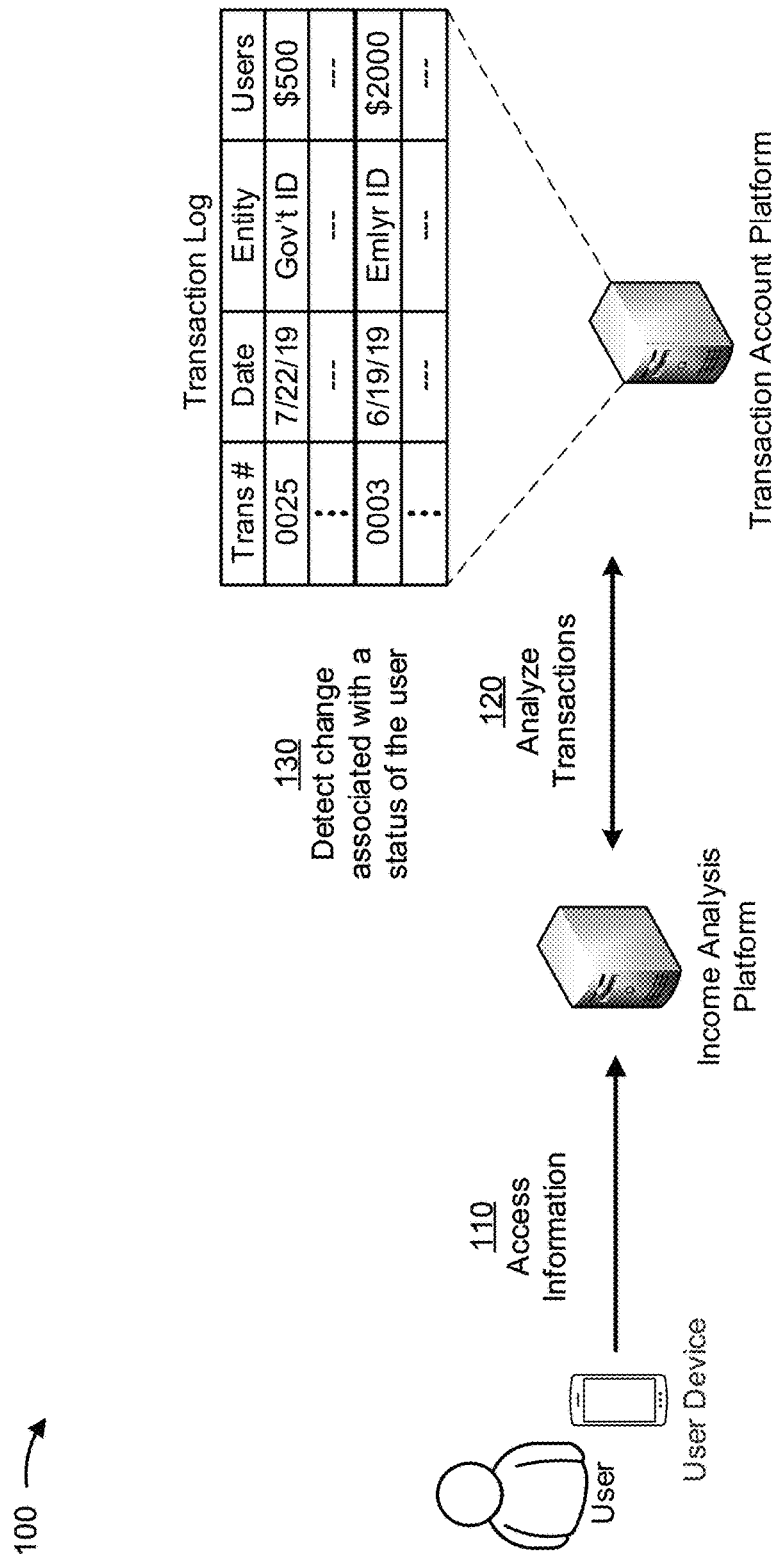
FIGS. 1A-1C are diagrams of an example implementation described herein.

The following detailed description of example implementations refers to the accompanying drawings. The same reference numbers in different drawings may identify the same or similar elements.

In some instances, a user (e.g., an individual, such as a consumer, an account holder, and/or the like) may lose a source of income and/or a source of potential income. Meanwhile, the user may be engaged in one or more transactions (e.g., a loan, a credit agreement, and/or the like) with one or more entities (e.g., financial institutions, merchants, and/or the like). In such cases, a reduction in potential (or future) income stemming from losing the source of income can cause the user to experience difficulties associated with continuing to engage in the one or more transactions and/or other costs of living. In such cases, the user may seek to find a new job and/or apply to receive certain benefits, such as financial relief (e.g., reduced payments, payment grace periods, reduced interest, and/or the like associated with the one or more transactions), subsidized income (e.g., from a governmental entity), and/or the like. However, in many instances, there is delay in obtaining a new job (e.g., due to relatively long application and/or interview processes) and/or receiving such benefits (e.g., due to the application processes for the benefits), which can cause the user to fall further into debt, thereby further increasing the difficulties in continuing to engage in the one or more transactions and/or maintain an established way of life. Furthermore, the one or more entities engaged in the one or more transactions with the user may desire to maintain a relationship with the user (e.g., so as not to lose the user as a customer, debtor, business partner, and/or the like and/or any benefits associated with the user).

Some implementations described herein provide an income analysis platform that may proactively identify a potential loss of income of a user and perform an action associated with the user and the potential loss of income. For example, the income analysis platform may analyze employment-related activity of a user (based on the user opting-in to such an analysis), determine from the employment-related activity that the user may be or likely has become unemployed, and perform an action to address potential unemployment of the user. The employment-related activity may be associated with a transaction account of a user (e.g., no longer receiving employment-related income, receiving subsidized income, and/or the like), online activity of a user (e.g., searching for a job, accessing recruiting websites, changes to online activity during normal working hours of the user, and/or the like), purchase history of the user (e.g., showing a reduction in spending), information associated with an employer of the user (e.g., news indicating layoffs by the employer), and/or the like. Based on an analysis of such related activity, the income analysis platform may request the user to verify an employment status of the user, verify an amount of income that the user is receiving, verify a change in employment status, and/or the like. Additionally, or alternatively, the income analysis platform may interact with a transaction account platform to cause the transaction account platform to alter terms associated with one or more transactions of a transaction account of the user (e.g., reduce a minimum payment, reduce an interest rate, provision a payment grace period, extend a payment deadline, and/or the like).

Accordingly, the income analysis platform may enable a user to relatively seamlessly receive and/or an entity to relatively seamlessly provide relief associated with a transaction (and/or transaction account) by proactively monitoring an employment status (and/or income status) of the user and reducing (and/or offering to reduce) one or more terms associated with the transaction. In this way, an income analysis platform, as described herein, may efficiently, relative to previous techniques, detect an employment status of a user and/or correspondingly perform an action in association with a transaction account of the user, thereby conserving computing resources (e.g., by reducing processor resources and/or memory resources previously used to detect an employment status of a user, processing applications for relief, and/or the like) and/or network resources (e.g., by reducing a number of communications and/or inquiries associated with determining an employment status of a user, processing applications for relief, and/or the like). Furthermore, implementations described herein use a rigorous, scalable, computerized process (e.g., in association with and/or for thousands, millions, or more users, transaction accounts, and/or the like) to perform tasks or roles (e.g., simultaneously on the thousands, millions, or more users, transaction accounts, and/or the like) that were not previously performed. For example, previously, a technique did not exist to proactively analyze various employment indicators of a user (e.g., sources of income, online activity, content of messages, third party information, and/or the like), determine an employment status based on the indicators, and performing an action associated with a transaction account of the user based on the determined employment status. Furthermore, a process for detecting an employment status of a user, as described herein, conserves computing resources and/or network resources that would otherwise be wasted in attempting to reactively address a user being unemployed, a user losing a substantial amount of potential income, reactively performing an action in association with the transaction account of the user, contacting the user and/or working with the user to resolve stresses of unemployment, and/or the like.

Figure 1B:
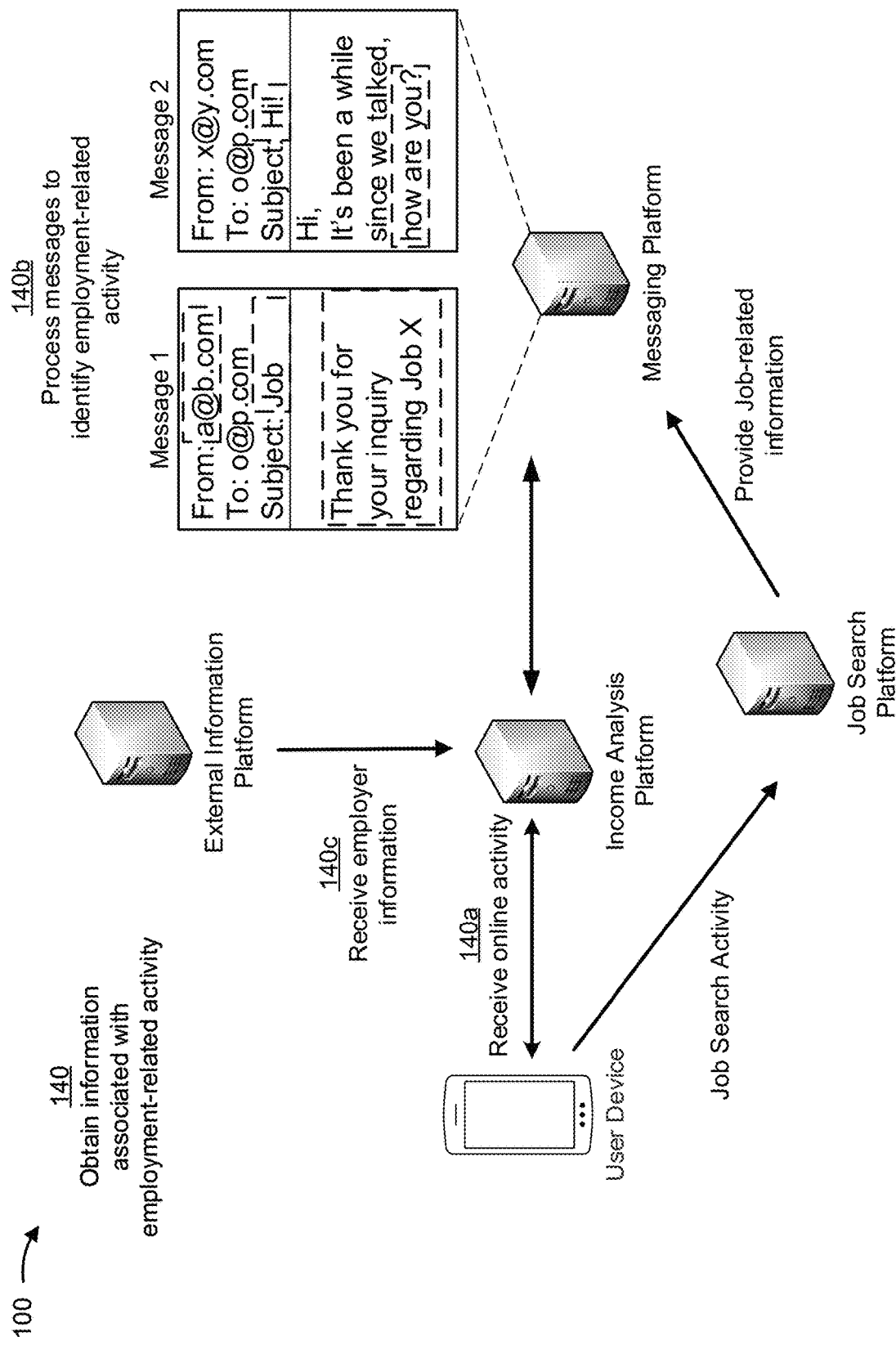
Figure 1C:
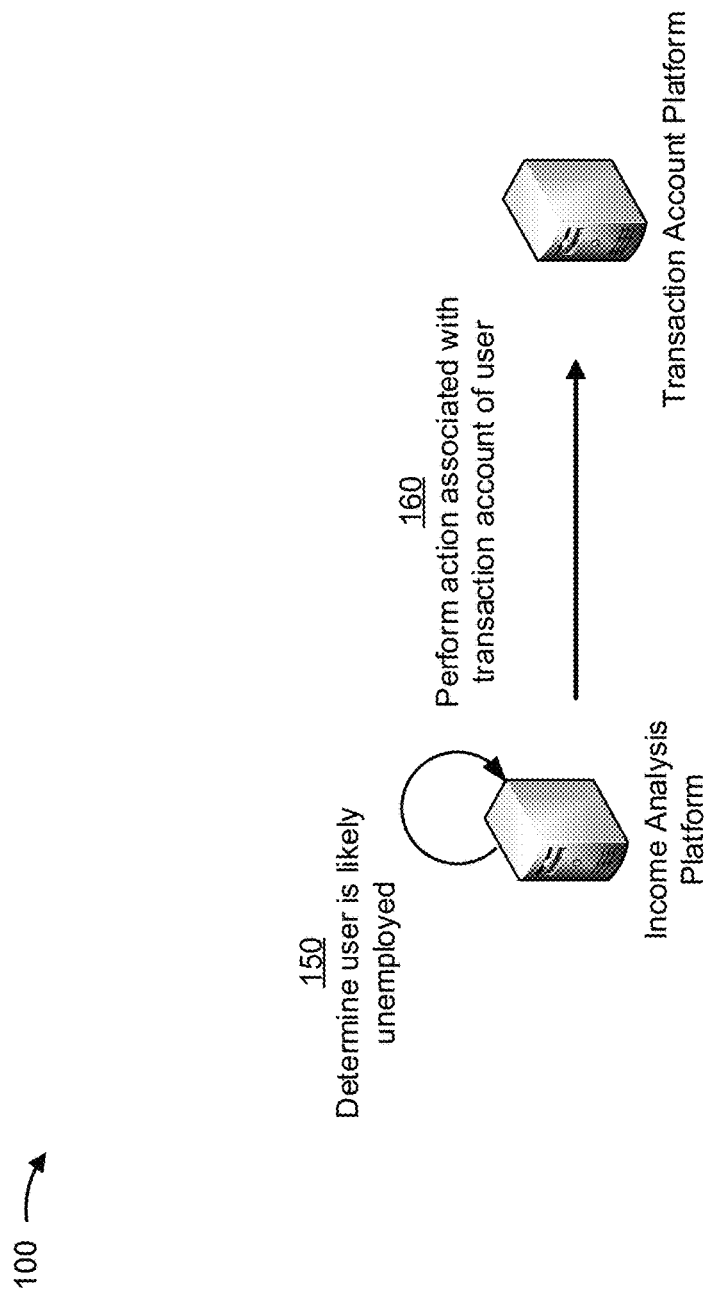

FIGS. 1A-1C are diagrams of an example implementation 100 described herein. Example implementation 100 includes a user device, an income analysis platform, a transaction analysis platform, and a transaction account platform. Furthermore, in example implementation 100, the income analysis platform may be in communication with the user device, an external information platform, and/or a messaging platform, and the user device and/or the messaging platform may interact with a job search platform that is associated with information involving jobs, employers, employment opportunities, and/or the like.

As shown in FIG. 1A, and by reference number 110, the income analysis platform may receive, from the user device, access information (e.g., that permits the income analysis platform to monitor income and/or employment associated with the user). For example, the user device may be associated with a user, and the access information may include a set of credentials associated with an account of the user, such as a transaction account (e.g., a financial account, such as a bank account, a credit account, a debit account, and/or the like) of the user, a messaging account of the user, an online account (e.g., an internet browser account, a search engine account, a social media account, a job search application account, an online shopping account, and/or the like), and/or the like. The set of credentials may include a username/password combination for the user and the account, a security token (e.g., that provides limited access to the account) associated with the user and the account, a biometric associated with the user, and/or the like.

As described herein, a transaction account may be associated with (e.g., registered to, available to, and/or the like) a user to permit the user to engage in transactions via the transaction account (e.g., using funds associated with the transaction account). The transaction account may be managed and/or maintained by the transaction account platform for the user (e.g., using a transaction log to permit the user to view and/or access transaction activity of the transaction account). In some implementations, the transaction account platform may manage hundreds, thousands, or more transaction accounts, each of which may be used in hundreds, thousands, or more transactions, and/or the like.

In some implementations, a messaging account may include an email account, a text messaging account, an instant messaging account, a voice messaging account, and/or the like. In some implementations, a messaging account may be associated with messages (e.g., stored on the user device, stored on a messaging platform utilized by the user of the user device, and/or the like), such as email messages, text messages, instant messages, and/or the like. In some implementations, a messaging account may store hundreds, thousands, or more messages from hundreds, thousands, or more third parties, that include different types of content (e.g., personal content, transaction-related content, employment-related content, and/or the like). As described herein, the messaging account may receive employment-related messages indicating an employment status of the user. Such an employment-related message may include information identifying the employment status of the user, indicating a change in the employment status of the user, whether the user is searching for a new job, whether the user has registered with a job search platform, and/or the like.

In some implementations, the income analysis platform may receive the access information based on requesting the access information from the user device (e.g., by providing a prompt via a display associated with the user device), based on a user of the user device inputting the access information (e.g., via a user interface, via an application installed on the user device, and/or the like), and/or the like. According to some implementations, the income analysis platform may perform a verification process to verify that a user that provided the input is an authorized user of the user device and/or an authorized user associated with an account described herein. Such a verification process may include requesting and processing credentials (e.g., a username, password, personal identification number, and/or the like), associated with an authorized user, personal information associated with an authorized user, security information associated with an authorized user, biometric information associated with an authorized user, and/or the like to authenticate the user. In some implementations, the income analysis platform may utilize a two-factor authentication process to receive authorization information from the user. The two-factor authentication process may increase a security of providing the income analysis platform with access to a component of the user device (as described below) by providing the income analysis platform with limited access to the component, by providing the user of the user device with control over whether the income analysis platform can access the component, and/or the like.

In some implementations, the access information may permit the income analysis platform to access a component (e.g., a microphone, a camera, a location device (e.g., such as a geolocation device and/or a geographical position system (GPS), and/or the like)) of the user device for a particular amount of time to permit the income analysis platform to obtain location information associated with the user (e.g., to determine whether the user is no longer going to a place of employment). In some implementations, the income analysis platform may prompt the user of the user device to permit the income analysis platform to access the component of the user device. In some implementations, after receiving the access information, the income analysis platform may access the component of the user device using the access information. For example, the income analysis platform may access a location system of the user device to determine a location of the user device, a camera or microphone to authenticate the user (e.g., using a biometric analysis, such as facial recognition, using voice recognition, and/or the like), and/or the like.

In some implementations, the access information may permit the income analysis platform to access a browser and/or software application associated with the user (e.g., a client application on the user device or other device associated with the user, a server application serving a client application of the user, and/or the like) for monitoring online activity, social media activity, and/or the like. In some implementations, the income analysis platform may prompt the user of the user device to permit the income analysis platform to access the browser and/or software application associated with the user. In some implementations, after receiving the access information, the income analysis platform may access the browser and/or software application to monitor the user's online activity, social activity, and/or the like.

To maintain privacy of a user associated with a transaction account, the income analysis platform may ensure that the user opts in (e.g., via the access information) to enable access to the messaging account, monitoring of transactions and/or access to the transaction account, and/or the like, monitoring and/or access to private information of the user, and/or the like. Accordingly, the income analysis platform may be configured to abide by any and all applicable laws with respect to maintaining the privacy of the user and/or content of the user's messaging account, transaction account, and/or the like. In some implementations, the income analysis platform may not download (or permanently store) any messages, transaction information, audio or image files or data, and/or the like, from the user device, the income analysis platform may anonymize and/or encrypt any private information associated with the user and/or accounts, messages, images, audio, and/or the like of the user, and/or the like.

In some implementations, the income analysis platform may have or may be configured to have limited access to the transaction account, the messaging account, images or audio associated with the user, and/or the like. For example, the income analysis platform may be configured to only have access to the transaction account periodically and for a threshold time period and/or to a limited number of most recently posted transactions (e.g., the last ten transactions, twenty transactions, and/or the like), to only have access to a limited number of most recently received messages (e.g., the last ten messages, twenty messages, and/or the like), to only have access to messages with certain keywords or phrases (e.g., keywords or phrases representative of a transaction, keywords or phrases representative of an employer or employment status, and/or the like), to only have access to a particular folder of messages (e.g., a specific inbox), and/or the like. According to some implementations, the user may specify which information and/or the types of information that the income analysis platform may have access to and/or receive.

As described herein, the user may provide access information associated with controlling a component of the user device, accessing an account associated with the user, and/or enabling monitoring and/or analyzing of transaction information associated with user transactions. In some implementations, upon installing an application on the user device (e.g., an application for employment status detection based on transaction information), the application may request (e.g., via an authentication token) that the user authorize monitoring of the user's usage of the user device, characteristics of the user device, the user's transaction account and/or messaging account, and/or the like. Such a request may indicate to the user that the monitoring is for analyzing employment-related activity of a user, determining from the employment-related activity that the user may be or likely has become unemployed, and performing an action to address potential unemployment of the user. With an approval authorizing monitoring and/or analyzing of transaction information associated with user transactions, the application may monitor and/or analyze transaction information to detect an employment status of the user. In some implementations, the application may prompt the user to authorize monitoring and/or analyzing transaction information to detect an employment status of the user, as described herein. In some implementations, the application may not prompt the user to authorize monitoring and/or analyzing transaction information until a particular event has occurred (e.g., detection of a transaction, when a particular type of message is received, and/or the like), or may prompt the user to confirm a previous authorization when the particular event has occurred. The request and/or prompt may enable the user to opt out from being monitored by the application.

As further shown in FIG. 1A, and by reference number 120, the income analysis platform analyzes one or more transactions via the transaction account platform. For example, the income analysis platform may analyze one or more transactions in a transaction log of a transaction account associated with the user. The income analysis platform may process transactions to identify one or more employment-related transactions (e.g., income transactions, transactions from an entity that provides unemployment benefits, and/or the like). As shown, the income analysis platform may access a transaction account (e.g., a transaction account maintained by the transaction account platform) of the user and process the transactions in the transaction account (e.g., transactions that are maintained and/or stored in a transaction log of the transaction account platform). For example, the income analysis platform may process the transactions to identify employment-related activity. As used herein, employment-related activity may include income transactions in a transaction log of the transaction account. In some implementations, the transaction log may include amounts of income transactions, entities associated with income transactions, types of income transactions, transaction identifiers (e.g., transaction numbers), transaction dates, and/or the like. As used herein, a transaction that includes employment-related activity associated with the user is referred to as an "employment-related transaction." In some implementations, the income analysis platform may process hundreds, thousands, or more transactions in hundreds, thousands, or more transaction accounts associated with hundreds, thousands, or more users. Accordingly, the income analysis platform may perform one or more rigorous computerized processes to process the transactions of the transaction account.

In some implementations, the income analysis platform may pre-process the transactions to reduce the quantity of transactions that are further processed to identify employment-related transactions, for example by identifying a characteristic of the transaction that indicates employment-related activity, such as a change in an employment status (e.g., based on a social media post and/or profile information update) and/or an income status of the user. The characteristics may include a source of the transactions (e.g., based on an identifier of a source of the transactions), whether the source is included on a list of sources (e.g., employers, unemployment benefits agencies, and/or the like), a time and/or date on which the transactions were processed (e.g., designated and/or determined dates of payment), a type of the transaction, a value of the transaction, other information indicating a change in employment status, income status, and/or the like. Accordingly, the income analysis platform may not process transactions to identify an employment-related transaction unless the income analysis platform identifies a likelihood of transactions that are associated with employment-related activity. In this way, the income analysis platform may conserve computing resources and/or network resources that may otherwise by consumed by processing transactions that could have been filtered out as irrelevant.

Additionally, or alternatively, the income analysis platform may ignore transactions (e.g., transactions involving entities that are not likely to be associated with employment-related activity, such as debit transactions, transactions that are below a threshold value, and/or the like). For example, the income analysis platform may identify transactions associated with an entity that may be likely to be associated with an employment-related transaction by performing a lookup of an identifier associated with the entity, by analyzing a repository of hundreds, thousands, or more transactions to determine if the entity was involved in a same type of transaction associated with other transaction accounts (e.g., indicating that the transaction may be an employment-related transaction), and/or the like. Additionally, or alternatively, and as another example, the income analysis platform may analyze historical transactions (e.g., corresponding to identified employment-related transactions) associated with the transaction account and determine a pattern (e.g., a timing pattern, a value pattern, an entity pattern, a source pattern, and/or the like) for the employment-related transactions and may process and/or ignore transactions of the transaction account based on the pattern.

Additionally, or alternatively, the income analysis platform may identify one or more fields of entries of a transaction log associated with the transaction account and may ignore transactions with entries that include particular combinations of identifiers of entities, identifiers of sources, values of the transactions, dates of the transactions, and/or the like. Such a technique conserves processing resources of the income analysis platform by reducing a quantity of transactions that the income analysis platform may be required to process, by filtering out transactions that are unlikely to be employment-related transactions, and/or the like.

In some implementations, the income analysis platform may process the transaction log using a combination of processing techniques (e.g., after pre-processing the transactions) to identify transactions that may be employment-related transactions. For example, the income analysis platform may process the transaction log using a text processing technique (e.g., a natural language processing technique, a text analysis technique, and/or the like), a code processing technique, and/or the like. In some implementations, the income analysis platform may process the transaction log using an image processing technique (e.g., a computer vision technique, an optical character recognition (OCR) technique, and/or the like to identify text corresponding to transactions of the transaction log).

In some implementations, when processing the transaction log using the text processing technique, the income analysis platform may process text of entries in the transaction log to identify terms, phrases, and/or the like included in the text (e.g., to identify an employment-related transaction included in the text, to extract information related to the employment-related transaction, and/or the like). For example, the income analysis platform may process the text of the transactions to identify terms and/or phrases that may be likely related to an employment-related transaction, that identify a source of income (e.g., an employer, an unemployment benefits agency, a transfer from a savings account, a retirement account, and/or the like) with which an employment-related transaction is likely to be associated, and/or the like.

In some implementations, when processing the transaction log using the code processing technique, the income analysis platform may process code associated with the transaction log to identify an employment-related transaction included in the transaction log, to identify information related to the employment-related transaction, and/or the like. For example, the income analysis platform may analyze code (e.g., hypertext markup language (HTML) code, cascading style sheet (CSS) code, and/or the like) associated with the transaction log and/or transaction account platform, tags within the code (e.g., a div tag, an image tag, text-related tags, and/or the like) that are associated with the transactions, and/or the like.

In some implementations, by processing the code, tags within the code, and/or the like, the income analysis platform may be capable of identifying text within the transaction log. For example, the income analysis platform may be configured with information that identifies a hierarchy of the code associated with the transaction log (e.g., the code may be structured in a hierarchical manner that impacts execution of the code, tags associated with the code may have a hierarchical structure to organize entries of the transaction log in the code and/or to impact a manner in which the transaction log is provided for display, and/or the like).

In some implementations, the income analysis platform may scan the hierarchical structure of the code associated with a transaction log to identify an employment-related transaction, to identify information related to the transaction log (entries corresponding to transactions in the transaction log), and/or the like. For example, the income analysis platform may scan the hierarchical structure of the code to identify fields, entries, and/or text in the code. Continuing with the previous example, if the income analysis platform identifies a field in the code of the transaction, then the income analysis platform may scan the hierarchical structure (e.g., tags that are at a higher or lower level in the hierarchical structure) to identify information (e.g., text, metadata, an entry, and/or the like) that may be associated with the field. Continuing still with the previous example, the income analysis platform may then process the information associated with the field to determine whether the field is associated with an employment-related transaction (e.g., using a text processing technique to identify terms, phrases, values, and/or the like included in the information that indicates that the field is a field of an entry for an employment-related transaction).

In some implementations, the income analysis platform may obtain one or more templates associated with employment-related transactions that are associated with one or more sources of income known to engage in and/or be sources of employment-related transactions. For example, the templates may indicate and/or define a particular format, a particular value, a particular entity identifier, and/or the like so that corresponding transactions can be identified as employment-related transactions. The income analysis platform may store the one or more template employment-related transactions in a data structure to enable the income analysis platform to use the template employment-related transaction to process the transaction log of the transaction account. Accordingly, the income analysis platform may obtain, from the data structure, the employment-related transaction for the source of income involved in the transaction and use the template employment-related transaction to process the transaction log of the transaction account (e.g., by ignoring transactions that do not follow the template and/or recognizing employment-related transactions in transactions that do follow the template) and/or other transaction accounts.

In some implementations, the income analysis platform may determine a score that indicates a likelihood that a transaction is an employment-related transaction based on a result of processing the transaction. For example, the income analysis platform may use a machine learning model, such as a transaction analysis model, that has been trained on a training set of data that identifies results of processing transactions and corresponding scores indicating a likelihood that the transactions are employment-related transactions. In some implementations, the income analysis platform may use the score to identify transactions from which to extract entities, values, and/or the like associated with employment-related transactions, transactions to process, transactions to tag, and/or the like, as described elsewhere herein. This conserves processing resources by providing the income analysis platform with an efficient way to identify transactions that are likely to be employment-related transactions, thereby reducing a quantity of transactions that the income analysis platform processes that are not employment-related transactions.

Accordingly, the income analysis platform may train the transaction analysis model based on one or more parameters associated with identifying employment-related transactions, such as a format of an employment-related transaction, a template of an employment-related transaction, a field (e.g., a date field, an entity field, a value field, and/or the like) associated with an employment-related transaction, a type of an employment-related transaction (e.g., a debit transaction, a credit transaction, and/or the like), an entity or source associated with an employment-related transaction, and/or the like. The income analysis platform may train the transaction analysis model using historical data associated with identifying employment-related transactions within a transaction log of a transaction account according to the one or more parameters. Using the historical data and the one or more parameters as inputs to the transaction analysis model, the income analysis platform may determine that a transaction of a transaction log is an employment-related transaction or that a transaction is not an employment-related transaction in order to determine whether the transaction log includes an employment-related transaction associated with the user.

In some implementations, the income analysis platform may perform batch processing of the transactions in the transaction account in order to determine whether the transaction account includes an employment-related transaction. For example, the income analysis platform may process a first batch of transactions based on detecting a change in the set of transactions (e.g., identifying an income transaction that is less than another income transaction, identifying a new source of income, identifying a new transaction associated with an unemployment benefits agency, and/or the like). The first batch may correspond to the set of transactions processed between the time of detecting the change in the set of transactions and a first time after detecting the change in the set of transactions (e.g., within a day, five days, one month, and/or the like). If the income analysis platform determines that the first batch of transactions does not include an employment-related transaction for the transaction, then the income analysis platform may process a second batch of transactions received between the first time after the transaction and a second time after the transaction (e.g., within a day, five days, one month, and/or the like after the first time). If the income analysis platform determines that the second batch of transactions does not include an employment-related transaction for the transaction, the income analysis platform may process a third batch, and so on.

In this way, the income analysis platform may analyze the transaction to identify employment-related transactions (and/or a change in income) to permit the income analysis platform to determine whether the transactions reflect a change in an employment status and/or income status of the user.

As further shown in FIG. 1A, and by reference number 130, the income analysis platform detects a change associated with a status of the user. For example, the income analysis platform may determine that an employment status and/or an income status associated with a user may have changed based on analyzing a set of transactions in the transaction log. The set of transactions may correspond to income transactions of the user that reflect payments (e.g., credits) to a balance of the transaction account (e.g., indicating that the user received a payment).

According to some implementations, the income analysis platform may detect that an income transaction occurred, and analyze the income transaction to determine whether an entity involved in the income is a new source of income or is associated with a new source of income of the user. The income analysis platform may determine that the entity is associated with a new source of income based on an identifier of the entity being different from a mapping of other identifiers for other sources of income. In some implementations, the income analysis platform may determine that the entity is a new source of income after a threshold number of income transactions (e.g., two or more) associated with the entity are identified in the transaction log. In some implementations, the income analysis platform may determine a change to an employment status and/or an entity status based on an amount of the income transaction satisfying a threshold. For example, if the income analysis platform does not recognize that the source of income is an unemployment benefits agency, the income analysis platform may analyze values associated with income transactions and determine that a recent transaction income satisfies a threshold that is relative to a previous transaction income (e.g., a threshold that corresponds to a percentage of an amount of income received from an employer and/or an unemployment benefits percentage). Accordingly, the income analysis platform may analyze a transaction to determine whether the transaction corresponds to a change in a status of the user.

In some implementations, the income analysis platform may determine that a characteristic of a set of transactions indicates that the set of transactions correspond to a potential change in an employment status associated with the user and/or a change in an income status associated with the user. For example, the income analysis platform may determine that the set of transactions involve different entities (e.g., different entities may correspond to a change in an employer and/or source of income), an entity determined to be a new source of income (e.g., based on the entity not being identified in a mapping or data structure of the income analysis platform as a source of income for the user), that the set of transactions involve a threshold difference in value (e.g., a threshold decrease may indicate a loss of employment), that there is a particular relationship between values of the set of transactions (e.g., one transaction may correspond to a fraction of the other that corresponds to an unemployment income ratio), that at least one of the set of transactions are associated with a particular entity (e.g., a governmental entity, such as an unemployment agency), and/or the like. Accordingly, information associated with the set of transactions may include a characteristic (e.g., a time, a transaction value, a source, and/or the like) that indicates a likelihood that the transaction is related to a change in employment status and/or source of income.

In this way, the income analysis platform may determine that there is likely a change in an employment status and/or income status of the user to permit the income analysis platform to verify the employment status and/or income status of the user.

As shown in FIG. 1B, and by reference number 140, the income analysis platform obtains information associated with employment-related activity. As shown, the income analysis platform may obtain the information from the user device, the messaging platform, and/or the external information platform. In some implementations, the income analysis platform may obtain the information based on detecting the change associated with the set of transactions, a potential change in an income status of the user, a potential change in an employment status of the user, and/or the like.

In some implementations, if the income analysis platform determines that the set of transactions indicate a likely change in employment and/or income associated with the user (e.g., based on one or more of the characteristics described above), the income analysis platform may perform one or more operations to obtain and/or analyze information associated with employment-related activity of the user. In such cases, the income analysis platform may identify the characteristic and/or identify that the transaction is likely employment related (e.g., based on the characteristic), and process information associated with employment-related activity, as described herein. On the other hand, if the income analysis platform determines that a transaction likely is not employment-related (e.g., based on a threshold probability), then the income analysis platform may forego monitoring or processing employment-related activity associated with the user. The threshold probability may be a static threshold (e.g., 50% likely employment-related, 75% likely employment-related, 90% likely employment-related, and/or the like) or a transaction specific threshold that is based on one or more characteristics of the transaction. Therefore, computing resources and/or network resources that may otherwise be wasted processing employment-related activity associated with the user can be conserved.

As further shown in FIG. 1B, and by reference number 140a, the income analysis platform may obtain online activity associated with the user. For example, the income analysis platform may be configured to monitor online activity of a user, such as the user browsing webpages using a browser (e.g., on the user device) to research employment-related information (e.g., available jobs, unemployment benefits information, and/or the like). Such online activity and/or similar online activity (e.g., social media activity, searches, sending messages, accessing media, and/or the like) involving employment-related information may indicate that the user is interested in finding a new job, is learning about unemployment benefits, is potentially unemployed, is seeking to use funds from a savings account and/or retirement account (e.g., by accessing online platforms associated with those accounts), posting assets for sale (e.g., via an online marketplace), and/or the like. Similarly, in some implementations, other activity can be monitored (e.g., sending a message identifying the employment-related information, accessing offline media associated with the employment-related information, traveling to a location of a source of income (e.g., as described above) associated with employment-related information, and/or the like) to determine whether a user is interested in employment-related information.

While example implementation 100 may focus on monitoring the user's online activity, some implementations may monitor other types of user activity. For example, the income analysis platform may monitor activity associated with a location of the user (e.g., via a location device of the user device), activity associated with the user being involved in a particular event (e.g., a meeting with a potential employer and/or unemployment benefits agency) or being scheduled to be involved in a particular event (e.g., based on a calendar associated with the user), and/or the like. Accordingly, one or more activities may involve a user's action, a user's location, and/or other similar activity or characteristics of the activity.

In example implementation 100, the online activity may be monitored on the user device associated with a user. For example, the online activity may be monitored via an application running on the user device and/or an application (e.g., an applet, an application programming interface, a plug-in, a browser extension, and/or the like) installed on a browser of the user device. The online activity may be monitored using any suitable techniques, such as scraping hypertext markup language (HTML) associated with the online activity, capturing search strings associated with the online activity, and/or the like.

As further shown in FIG. 1B, and by reference number 140b, the income analysis platform may process messages to identify employment-related activity. As shown, the income analysis platform may access a messaging account (e.g., a messaging account maintained by the messaging platform) of the user and process the messages in the messaging account (e.g., messages that are maintained and/or stored by the messaging platform). For example, the income analysis platform may process the messages to identify employment-related activity. As used herein, employment-related activity may include a purchase history of the user, a type of online activity of the user, timing of online activity of the user, an amount of online activity of the user that is employment-related, content of a message account of the user, employment-related social media activity of the user, information associated with an employer associated with the user, and/or the like. For example, the employment-related activity may include job search results, job posting emails, job search website registrations, and/or the like.

As used herein, a message that includes employment-related activity is referred to as an "employment-related message". In some implementations, the income analysis platform may process hundreds, thousands, or more messages in hundreds, thousands, or more messaging accounts associated with hundreds, thousands, or more users. Accordingly, the income analysis platform may perform one or more rigorous computerized processes to process the messages of the messaging account.

In some implementations, the income analysis platform may pre-process the messages to reduce the quantity of messages that are further processed to identify employment-related messages, for example by identifying a characteristic of the message that suggests a change in an employment status and/or an income status of the user. The characteristics may include a source of the messages (e.g., domain name of a source of the messages, whether the source is included on a list of sources (e.g., job search entities, employment recruiters, and/or the like), and/or the like), a folder into which the messages have been filtered by the messaging platform (e.g., an inbox, a promotions folder, a spam folder, a customized folder, and/or the like), a time and/or date on which the messages were received (e.g., messages received before the time and/or date of the detected changes in the set of transactions (e.g., corresponding to a drop in income) and/or a transaction (e.g., being received from a new source of income and/or an entity that provides an unemployment benefit), and/or the like. Accordingly, the income analysis platform may not process messages to identify an employment-related message unless the income analysis platform identifies a likelihood that the messages include employment-related activity. In this way, the income analysis platform may conserve computing resources and/or network resources that may otherwise be consumed by processing messages that could have been filtered out as irrelevant.

Additionally, or alternatively, the income analysis platform may ignore messages (e.g., from third parties that are not likely to be associated with employment-related activity, such as personal messages, newsletters, and/or the like). For example, the income analysis platform may identify messages associated with a third party that may be likely to be associated with an employment-related message by performing a lookup of a domain name associated with a message, by analyzing a repository of hundreds, thousands, or more messages to determine if the same type of message was sent to other messaging accounts (e.g., indicating that the message may be employment-related activity), by performing a lookup of a portion of a source identifier (e.g., a user identifier before the "@" symbol in an email address), and/or the like. Additionally, or alternatively, and as another example, the income analysis platform may analyze historical messages associated with a folder and determine a theme for the folder and may ignore messages in that folder (e.g., a folder with a personal theme, a promotional theme, and/or the like) and/or process the messages in that folder (e.g., an employment-related folder, an income folder, a transaction folder, a receipt folder, and/or the like) based on the theme.

Additionally, or alternatively, the income analysis platform may identify terms and/or phrases included in a subject line and/or in a body of a message and may ignore messages that include particular combinations of terms and/or phrases. Additionally, or alternatively, and as another example, the income analysis platform may ignore duplicate messages (e.g., messages that have the same header, the same body, the same unique identifier, and/or the like). Such a technique conserves processing resources of the income analysis platform by reducing a quantity of messages that the income analysis platform may be required to process, by filtering messages that are unlikely to be employment-related messages, and/or the like.

In some implementations, the income analysis platform may process the messages using a combination of processing techniques (e.g., after pre-processing the messages) to identify messages that may be employment-related messages. For example, the income analysis platform may process the messages using an image processing technique (e.g., a computer vision technique, an optical character recognition (OCR) technique, etc.), a text processing technique (e.g., a natural language processing technique, a text analysis technique, etc.), a code processing technique, and/or the like.

In some implementations, when processing the messages using the image processing technique, the income analysis platform may process images associated with the messages. In some implementations, the income analysis platform may identify that a message includes an image by detecting that the message includes an image as an attachment (e.g., based on a file type of the attachment), by detecting an image in a body of the message (e.g., as compared to detecting text in the body of the message), by processing code associated with the message to detect an image (e.g., by detecting an image tag in code of an email or by detecting a unique resource identifier for an image included in the code), and/or the like. In some implementations, the income analysis platform may process the image to identify a term, a phrase, a logo, a symbol, and/or the like included in the image. For example, the income analysis platform may process the image using OCR to identify employment-related activity included in the image, an entity associated with the employment-related activity (e.g., an income source, an employer, and/or the like), and/or the like.

Additionally, or alternatively, the income analysis platform may capture an image of the body of a message (e.g., text and images included in the body of the message), such as by saving a copy of the message as a portable data format (PDF) document or by capturing a screen shot of the message, and may process the image in a similar manner (e.g., to identify terms, phrases, logos, and/or the like included in the image of the body of the message). For example, the income analysis platform may capture an image of text of the message, images included in the message, and/or the like and may process the image to identify employment-related activity included in the message, to extract information related to the employment-related activity from the message, and/or the like.

In some implementations, an image associated with the message may include one or more employment-related activities, may include a single employment-related activity, may be comprised of multiple images, and/or the like. In some implementations, the income analysis platform may identify multiple employment-related activities in a single image. For example, when processing the image, the income analysis platform may identify characteristics of the image that indicate that multiple employment-related activities are included in the image. Continuing with the previous example, the income analysis platform may identify each of the multiple employment-related activities in the image by identifying lines or boxes in the image that surround or separate the multiple employment-related activities in the image from each other, by identifying multiple unique identifiers in the image (e.g., identifiers of job search engines, identifiers of potential employers, and/or the like), by identifying repeating terms and/or phrases in the image (e.g., multiple transaction dates associated with corresponding transactions), and/or the like.

In some implementations, when processing the messages using the text processing technique, the income analysis platform may process text of the message to identify terms, phrases, and/or the like included in the text (e.g., to identify employment-related activity included in the text, to extract information related to the employment-related activity, and/or the like). For example, the income analysis platform may process the text of the messages to identify terms, phrases, and/or context (e.g., using natural language processing) that may likely be related to an employment-related activity, that identify a source of income (e.g., an employment-related entity) with which an employment-related activity is likely to be associated, and/or the like.

In some implementations, when processing the messages using the code processing technique, the income analysis platform may process code associated with the messages to identify employment-related activity included in the messages, to identify information related to the employment-related activity, and/or the like. For example, the income analysis platform may analyze code (e.g., hypertext markup language (HTML) code, cascading style sheet (CSS) code, and/or the like) associated with messages, tags within the code (e.g., a div tag, an image tag, text-related tags, and/or the like) that are associated with the messages, and/or the like.

In some implementations, by processing the code, tags within the code, and/or the like, the income analysis platform may be capable of identifying text within the message, images within the message, and/or the like that indicate a likelihood that the message is associated with employment-related activity. For example, the income analysis platform may be configured with information that identifies a hierarchy of the code associated with the message (e.g., the code may be structured in a hierarchical manner that impacts execution of the code, tags associated with the code may have a hierarchical structure to organize information in the code and/or to impact a manner in which the information is provided for display, and/or the like). In some implementations, the income analysis platform may scan the hierarchical structure of the code associated with a message to identify employment-related activity included in the message, to identify information related to the message, and/or the like. For example, the income analysis platform may scan the hierarchical structure of the code to identify text and/or images included in the code. Continuing with the previous example, if the income analysis platform identifies an image in the code of the message, then the income analysis platform may scan the hierarchical structure (e.g., tags that are at a higher or lower level in the hierarchical structure) to identify information (e.g., text, metadata, etc.) that may be associated with the image. Continuing still with the previous example, the income analysis platform may then process the information associated with the image to determine whether the image includes employment-related activity (e.g., using a text processing technique to identify terms, phrases, and/or the like included in the information that indicates that the image includes employment-related activity.

In some implementations, the income analysis platform may obtain one or more template employment-related messages that are associated with one or more employment-related entities (e.g., a job search engine, a recruiter, a potential employer, a governmental entity (that provides unemployment benefits), and/or the like) known to send employment-related messages. The income analysis platform may store the one or more template employment-related messages in a data structure to enable the income analysis platform to use the template employment-related message to process the messages of the messaging account. Accordingly, the income analysis platform may obtain, from the data structure, the employment-related message for the employment-related entity involved in the transaction and use the template employment-related message to process the messages of the messaging account (e.g., by ignoring messages that do not follow the template and/or recognizing employment-related activity in messages that do follow the template).

In some implementations, the income analysis platform may determine a score that indicates a likelihood that a message includes an employment-related activity based on a result of processing the message. For example, the income analysis platform may use a machine learning model, such as a message analysis model, that has been trained on a training set of data that identifies results of processing messages and corresponding scores indicating a likelihood that the messages include an employment-related activity. In some implementations, the income analysis platform may use the score to identify messages from which to extract employment-related activity, messages to process, messages to tag, messages marked as read or unread (e.g., read messages may indicate a higher likelihood, relative to unread messages, that the user has an interest in employment-related activity), and/or the like, as described elsewhere herein. This conserves processing resources by providing the income analysis platform with an efficient way to identify messages that are likely to include and/or be associated with employment-related activity, thereby reducing a quantity of messages that the income analysis platform processes that do not include employment-related activity.

Accordingly, the income analysis platform may train the message analysis model based on one or more parameters associated with identifying employment-related activity in one or more messages, such as a format of an employment-related message, a template of an employment-related message, an image associated with an employment-related message, a field (e.g., a date field, a time field, a job search query, a job search result field, and/or the like) associated with an employment-related message, a type of an employment-related message (e.g., a notification message, a receipt, and/or the like), an employment-related entity associated with an employment-related message, an attachment associated with an employment-related message, and/or the like. The income analysis platform may train the message analysis model using historical data associated with identifying employment-related activities within messages according to the one or more parameters. Using the historical data and the one or more parameters as inputs to the message analysis model, the income analysis platform may determine that a message is an employment-related message or that a message is not an employment-related message in order to determine whether a messaging account includes an employment-related message associated with employment-related activity.

In some implementations, the income analysis platform may perform batch processing of the messages in the messaging account in order to determine whether the messaging account includes an employment-related message. For example, the income analysis platform may process a first batch of messages based on a transaction and/or the detected change in the set of transactions The first batch may correspond to the set of messages received between the time of the transaction and a first time after the transaction and/or the detected change in the set of transactions (e.g., within a day, five days, one month, and/or the like). If the income analysis platform determines that the first batch of messages does not include an employment-related message for the transaction, then the income analysis platform may process a second batch of messages received between the first time after the transaction and a second time after the transaction (e.g., within a day, five days, one month after the first time, and/or the like). If the income analysis platform determines that the second batch of messages does not include an employment-related message for the transaction, the income analysis platform may process a third batch, and so on.

In some implementations, the income analysis platform may use a machine learning model, such as a batch processing model, to determine a number of the batches of messages that are to be processed and/or determine lengths of time periods between processing the batches of messages. For example, the income analysis platform may train the batch processing model based on one or more parameters associated with a transaction and/or the detected change in the set of transactions, such as an entity associated with one or more of the set of transactions, a value associated with one or more of the set of transactions, a date of one or more of the set of transactions, and/or the like. Additionally, or alternatively, the income analysis platform may train the batch processing model based on one or parameters associated with the user involved in a transaction and/or the detected change in the set of transactions, such as a location associated with the user (e.g., a home address, a work address, a known location of the user, and/or the like), a status of a financial account of the user (e.g., whether the account is in good standing, on hold, and/or the like), and/or the like. Additionally, or alternatively, the income analysis platform may train the batch processing model based on one or more parameters associated with the messaging account, such as a type of the messaging account, a service provider associated with the messaging account, a format of the messaging account, and/or the like. The income analysis platform may train the batch processing model using historical data associated with determining the number of batches and/or the time periods between processing the batches according to the one or more parameters associated with a transaction and/or the detected change in the set of transactions, the one or more parameters associated with the user, and/or the one or more parameters associated with the messaging account. Using the historical data and these parameters as inputs to the batch processing model, the income analysis platform may perform batch processing of the messages in the messaging account to determine whether the messaging account received an employment-related message associated with a characteristic that indicates employment-related activity, such as a change in an employment status and/or an income status of the user.

In this way, by batch processing the messages of the messaging account, the income analysis platform may conserve computing resources and/or network resources by accessing the messaging platform at certain times to process the messages, rather than continuously using computing resources and/or network resources to monitor the messaging account for received messages.

As further shown in FIG. 1B, and by reference number 140c, the income analysis platform may receive, from the external information platform, employer information associated with an employer of the user. For example, the external information platform may include and/or be associated with one or more online platforms configured to generate and/or provide information associated with an employer of the user. Such online platforms may include news organizations, search engines and/or platforms, employer websites, and/or the like.

In some implementations, the income analysis platform may subscribe to a really simple syndication (RSS) feed of the external information platform that is configured to provide employer information to the income analysis platform. In some implementations, the RSS feed may be specific to employment-related information (e.g., to provide news associated with the employer hiring and/or terminating employees, removing positions from an organization structure of the employer, and/or the like). Additionally, or alternatively, the RSS feed may be specific to a particular employer (e.g., the employer of the user).

In this way, the income analysis platform may gather a plurality of employment-related information associated with the user to determine a likelihood of whether the user is employed or unemployed.

As shown in FIG. 1C, and by reference number 150, the income analysis platform determines that the user is likely unemployed. For example, the income analysis platform may determine, based on the analyzed set of transactions, the employment-related activity associated with the user, and/or the like that the user is likely unemployed. Correspondingly, the income analysis platform may determine that the user has lost potential income.

In some implementations, the income analysis platform may use a machine learning model, such as an employment analysis model, to determine from the employment-related activity a probability that the user is employed, unemployed, and/or that an employment status of the user has changed (e.g., in association with a decrease or increase in potential income). For example, the income analysis platform may train the employment analysis model based on one or more parameters associated with determining a probability that a user is employed or unemployed (and/or experienced a change in income), such as one or more of the characteristics indicating a potential change in an employment status and/or income status (e.g., the transaction log indicating a new source of income, the transaction log including a transaction associated with an unemployment benefits agency, the transaction log reflecting a decrease in income, and/or the like), an amount of online activity associated with employment-related activity, a period of time and/or timing associated with the online activity (e.g., whether the online activity occurs during typical working hours of the user, and/or the like), the type of online activity (e.g., job searching, social media activity, accessing job posts, reading/accessing email on job posts, and/or the like), one or more job platforms accessed during the online activity, types of employment-related information (e.g., information indicating mass layoffs, increased hiring, and/or the like) received from the external information platform, and/or the like. The amount of employment-related online activity may correspond to one or more webpages associated with employment opportunities, managing unemployment, and/or the like, a frequency with which the webpages were accessed, a number of employment-related searches, an amount of employment-related media (e.g., images, video, audio, and/or the like) that was accessed, a number of reviews associated with employment-related websites, applications, or programs, an amount of employment-related social media activity (e.g., likes, comments, follows, and/or the like), a number of employment-related messages (e.g., emails, texts, social media messages, and/or the like) sent or received, an amount of employer related information received from the external information platform, and/or the like. In some implementations, the income analysis platform may train the employment analysis model using historical data associated with the user and/or a plurality of other users purchasing the product according to the one or more parameters. Additionally, or alternatively, the income analysis platform may train the employment analysis model using historical data associated with determining an employment status of a user according to the one or more parameters. Using the historical data and the one or more parameters, associated with determining a probability that a user is employed and/or unemployed, as inputs to the employment analysis model, the income analysis platform may determine an employment status of the user and/or a probability that the user is employed or unemployed to perform an action associated with a transaction and/or a transaction account of the user.

According to some implementations, based on an analysis of the transaction log and/or the employment-related activity indicating that the user is likely unemployed, the income analysis platform may request that the user verify that the user is unemployed. For example, the income analysis platform may send a message (and/or other type of communication) to the user to request the user to verify and/or indicate the user's employment status. In this way, the income analysis platform may receive confirmation of the user's employment status. According to some implementations, the income analysis platform may train the employment analysis model (and/or any other model described herein) based on the user's response and the determined probability that the user is unemployed.

In this way, the income analysis platform may perform an analysis and/or operation to verify that the user is likely unemployed based on the analysis of the transaction log and/or employment-related activity of the user.

As further shown in FIG. 1C, and by reference number 160, the income analysis platform may perform an action associated with the transaction account of the user. For example, the income analysis platform may identify one or more services associated with the transaction account and/or the user, and/or one or more other transaction accounts of the user. For example, assuming the transaction account is a checking and/or savings account of the user, the income analysis platform may adjust settings associated with payments from the transaction account (e.g., payments associated with paying bills, payments associated with paying a debt to a credit account, a direct deposit requirement, and/or the like).

According to some implementations, the income analysis platform may adjust a service and/or cause a term of service to be adjusted based on determining that the user is likely unemployed (and/or has experienced a change in employment status and/or income status). For example, if the user is determined to be unemployed, the income analysis platform may adjust a service to reduce an amount of a scheduled transaction (e.g. a minimum payment amount due) involving the transaction account (e.g., a scheduled loan payment), extend a due date associated with a scheduled transaction from the transaction account (e.g., applying a grace period to extend an amount of time before a payment is due), reduce an interest rate associated with a transaction (e.g., a transaction of a debt payment plan) involving the transaction account, and/or the like.

In some implementations, the income analysis platform may perform such actions based on one or more factors involving the unemployment status of the user and/or the usage of the service associated with the transaction account. For example, if the user is continuing to increase a balance (e.g., a credit account balance) that is configured to be paid off using funds of the transaction account, the income analysis platform may not perform an action to reduce the amount due, an interest amount associated with the payment or future payments, and/or the like (e.g., because the user is not accounting for the reduced amount of income by reducing spending using the account). Accordingly, the income analysis platform may monitor the user's financial activity, during the user's unemployment (and/or period of experiencing reduced income), to determine whether to adjust a term of service associated with transactions involving the transaction account. In some implementations, the income analysis platform may provide an offer to the user to adjust one or more of the terms of the service to permit the user to authorize the change. Additionally, or alternatively, the income analysis platform may offer the user to place a limit on spending by the user (e.g., by enabling the user to authorize application of a spending limit to a transaction card and/or transaction account associated with the user), may offer to lock a transaction account (e.g., by enabling the user to authorize that the transaction account be locked until a level of income is returned to satisfactory condition), may provide an offer to the user to enable the user to sign up for a service and/or a transaction account with more favorable terms, may provide information to the user about an expert (e.g., a service representative, a financial planner, a life coach, and/or the like) that can assist the user in managing the reduced income and/or change in employment status, and/or the like.

In some implementations, when the income analysis platform determines the change in the employment status indicates that the user has a new employer and/or that the user is experiencing an increase in income (or potential income), the income analysis platform may provide an offer to adjust one or more terms of the service of the user (e.g., to be more beneficial to both the user and/or to the employer).

Accordingly, as described herein, an income analysis platform may permit an entity to proactively determine a user's employment and/or income status and perform one or more actions to benefit both the user and the employer. Such actions may conserve computing resources and/or network resources associated with a user experiencing a loss of a job and/or a loss of income (in addition to health benefits of the user, such as reducing stress, anxiety, and/or the like that comes with a loss of a job or income). In this way, the income analysis platform may enhance both a user experience with an entity and financial benefit of both the user and the entity (e.g., by permitting the entity to maintain consumer loyalty).

As indicated above, FIGS. 1A-1C are provided as one or more examples. Other examples may differ from what is described with regard to FIGS. 1A-1C.

Figure 2:
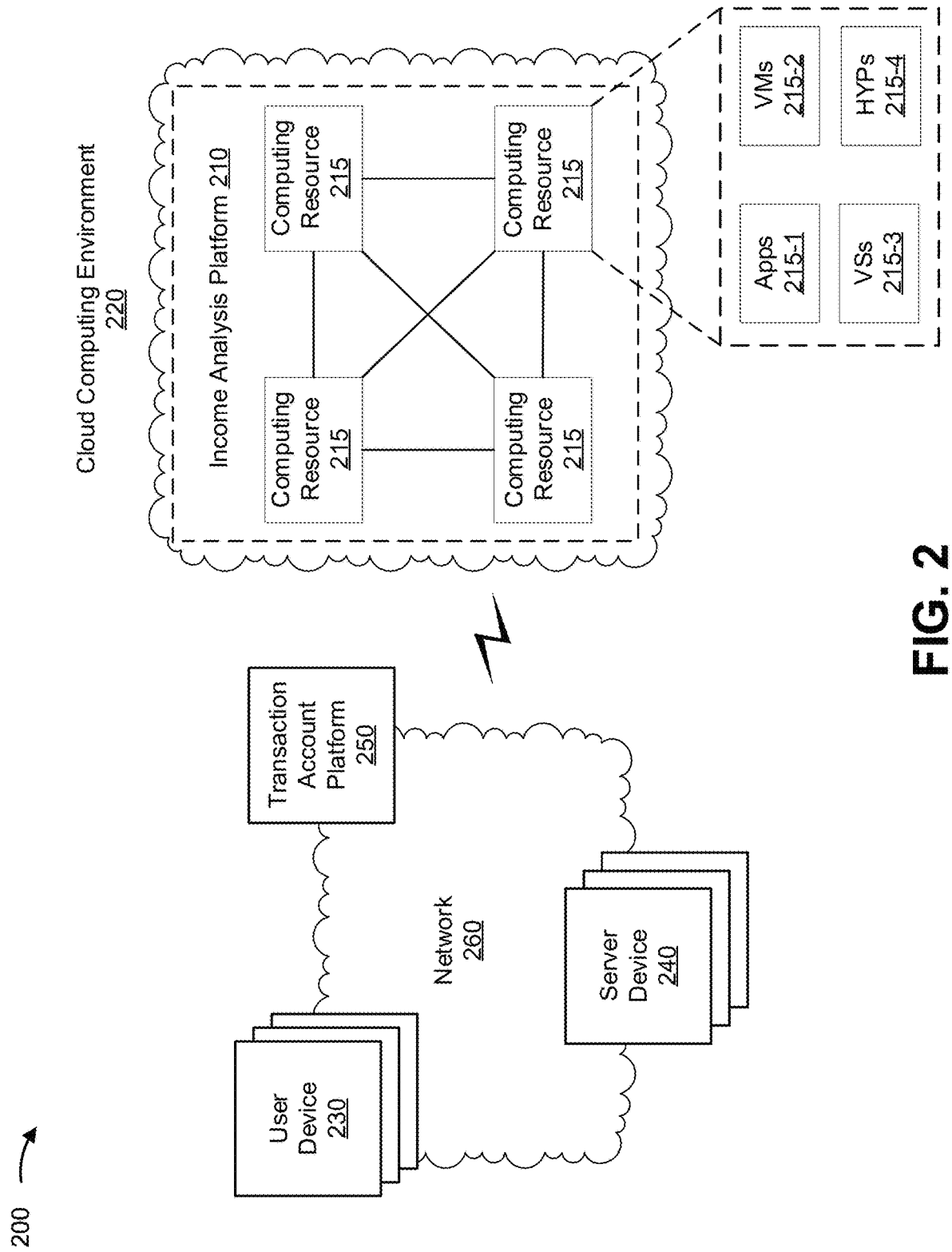
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include, an income analysis platform 210 hosted by one or more computing resources 215 in a cloud computing environment 220, one or more user devices 230 (referred to herein individually as user device 230 or collectively as user devices 230), one or more server devices 240 (referred to herein individually as server device 240 or collectively as server device 240), a transaction account platform 250, and a network 260. Devices of environment 200 may interconnect via wired connections, wireless connections, or a combination of wired and wireless connections.

Income analysis platform 210 includes one or more computing resources assigned to determine an employment status and/or income status of a user. For example, income analysis platform 210 may be a platform implemented by cloud computing environment 220 that may analyze employment-related transactions, employment-related activity, and/or employment-related information associated with a user, determine the employment status and/or income status, and perform one or more actions associated with the user in accordance with the determined employment status and/or income status. In some implementations, income analysis platform 210 is implemented by computing resources 215 of cloud computing environment 220.

Income analysis platform 210 may include a server device or a group of server devices. In some implementations, income analysis platform 210 may be hosted in cloud computing environment 220. Notably, while implementations described herein may describe income analysis platform 210 as being hosted in cloud computing environment 220, in some implementations, income analysis platform 210 may be non-cloud-based or may be partially cloud-based.

Cloud computing environment 220 includes an environment that delivers computing as a service, whereby shared resources, services, and/or the like may be provided to user device 230, server device 240, transaction account platform 250, and/or the like. Cloud computing environment 220 may provide computation, software, data access, storage, and/or other services that do not require end-user knowledge of a physical location and configuration of a system and/or a device that delivers the services. As shown, cloud computing environment 220 may include income analysis platform 210 and computing resource 215.

Computing resource 215 includes one or more personal computers, workstation computers, server devices, or another type of computation and/or communication device. In some implementations, computing resource 215 may host income analysis platform 210. The cloud resources may include compute instances executing in computing resource 215, storage devices provided in computing resource 215, data transfer devices provided by computing resource 215, and/or the like. In some implementations, computing resource 215 may communicate with other computing resources 215 via wired connections, wireless connections, or a combination of wired and wireless connections.

As further shown in FIG. 2, computing resource 215 may include a group of cloud resources, such as one or more applications ("APPs") 215-1, one or more virtual machines ("VMs") 215-2, virtualized storage ("VSs") 215-3, one or more hypervisors ("HYPs") 215-4, or the like.

Application 215-1 includes one or more software applications that may be provided to or accessed by user device 230. Application 215-1 may eliminate a need to install and execute the software applications on user device 230. For example, application 215-1 may include software associated with income analysis platform 210 and/or any other software capable of being provided via cloud computing environment 220. In some implementations, one application 215-1 may send/receive information to/from one or more other applications 215-1, via virtual machine 215-2.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports execution of a complete operating system ("OS"). A process virtual machine may execute a single program and may support a single process. In some implementations, virtual machine 215-2 may execute on behalf of a user (e.g., user device 230), and may manage infrastructure of cloud computing environment 220, such as data management, synchronization, or long-duration data transfers.

Virtualized storage 215-3 includes one or more storage systems and/or one or more devices that use virtualization techniques within the storage systems or devices of computing resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 215-4 provides hardware virtualization techniques that allow multiple operating systems (e.g., "guest operating systems") to execute concurrently on a host computer, such as computing resource 215. Hypervisor 215-4 may present a virtual operating platform to the "guest operating systems" and may manage the execution of the guest operating systems. Multiple instances of a variety of operating systems may share virtualized hardware resources.

User device 230 includes one or more devices capable of receiving, generating, storing, processing, and/or providing information associated with a user (e.g., employment-related information). For example, user device 230 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Server device 240 includes one or more devices capable of storing, processing, and/or routing information associated with employment-related activity. For example, one or more of server devices 240 may host one or more job search platforms, one or more messaging platforms, one or more social media platforms, one or more external information platforms, and/or the like (e.g., similar to the platforms in FIG. 1B). In some implementations, server device 240 may include a communication interface that allows server device 240 to receive information from and/or transmit information to other devices in environment 200.

Transaction account platform 250 includes one or more devices capable of receiving, generating, storing, processing, and providing information associated with managing a transaction account of a user. For example, transaction account platform may be associated with one or more server devices that include a communication interface that allows transaction account platform 250 to receive information from and/or transmit information to other devices in environment 200. In some implementations, transaction account platform 250 may include and/or have access to a data structure used to maintain a transaction log of an account of the user, profile information associated with the user, preferences associated with the user, and/or the like.

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
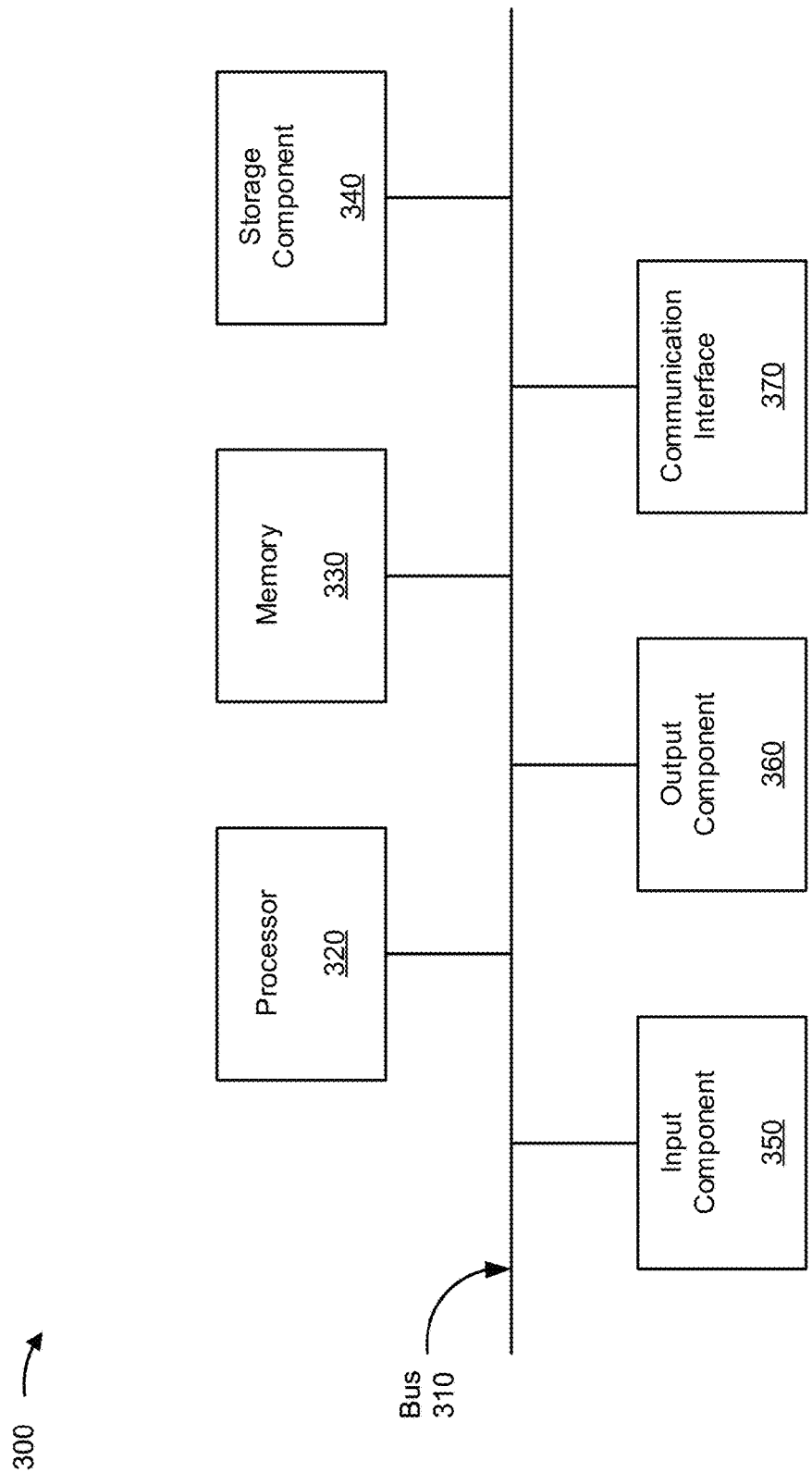
FIG. 3 is a diagram of example components of one or more devices of FIG. 2.

FIG. 3 is a diagram of example components of a device 300. Device 300 may correspond to computing resource 215, income analysis platform 210, user device 230, server device 240, and/or transaction account platform 250. In some implementations, computing resource 215, income analysis platform 210, user device 230, server device 240, and/or transaction account platform 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
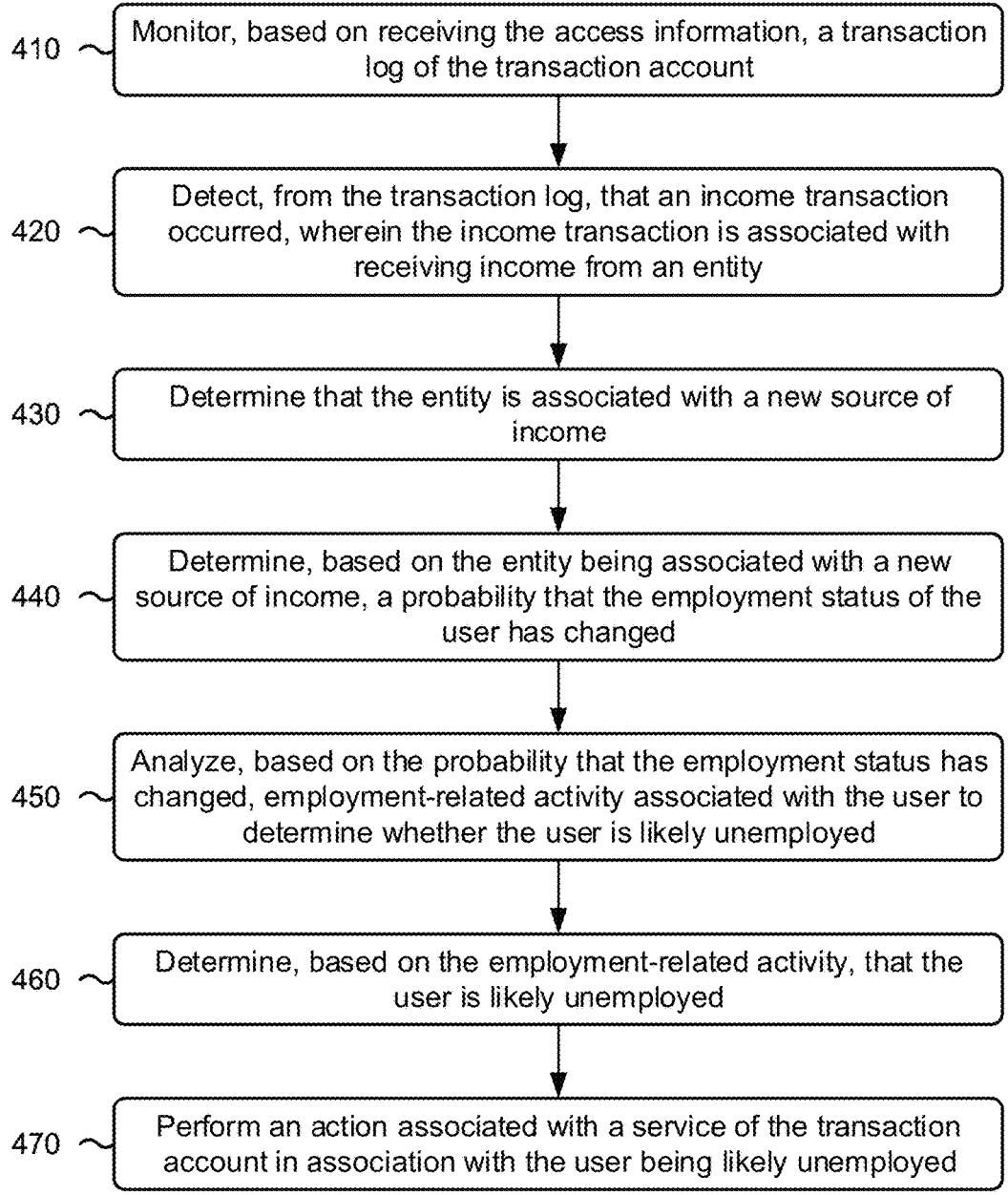
FIGS. 4-6 are flowcharts of one or more example processes associated with employment status detection based on transaction information.

FIG. 4 is a flow chart of an example process 400 associated with employment status detection based on transaction information. In some implementations, one or more process blocks of FIG. 4 may be performed by an income analysis platform (e.g., income analysis platform 210). In some implementations, one or more process blocks of FIG. 4 may be performed by another device or a group of devices separate from or including the income analysis platform, such as a user device (e.g., user device 230), server device (e.g., server device 240), a computing resource (e.g., computing resource 215), and/or the like.

As shown in FIG. 4, process 400 may include monitoring, based on receiving access information, a transaction log of a transaction account (block 410). For example, the income analysis platform (e.g., using processor 320, memory 330, storage component 340, input component 350, output component 360, communication interface 370 and/or the like) may monitor, based on receiving the access information, a transaction log of the transaction account, as described above.

As further shown in FIG. 4, process 400 may include detecting, from the transaction log, that an income transaction occurred, wherein the income transaction is associated with receiving income from an entity (block 420). For example, the income analysis platform (e.g., using processor 320, memory 330, storage component 340, input component 350, output component 360, communication interface 370 and/or the like) may detect, from the transaction log, that an income transaction occurred, as described above. In some implementations, the income transaction is associated with receiving income from an entity.

As further shown in FIG. 4, process 400 may include determining that the entity is associated with a new source of income (block 430). For example, the income analysis platform (e.g., using processor 320, memory 330, storage component 340, input component 350, output component 360, communication interface 370 and/or the like) may determine that the entity is associated with a new source of income, as described above.

As further shown in FIG. 4, process 400 may include determining, based on the entity being associated with a new source of income, a probability that the employment status of the user has changed (block 440). For example, the income analysis platform (e.g., using processor 320, memory 330, storage component 340, input component 350, output component 360, communication interface 370 and/or the like) may determine, based on the entity being associated with a new source of income, a probability that the employment status of the user has changed, as described above.

As further shown in FIG. 4, process 400 may include analyzing, based on the probability that the employment status has changed, employment-related activity associated with the user to determine whether the user is likely unemployed (block 450). For example, the income analysis platform (e.g., using processor 320, memory 330, storage component 340, input component 350, output component 360, communication interface 370 and/or the like) may analyze, based on the probability that the employment status has changed, employment-related activity associated with the user to determine whether the user is likely unemployed, as described above.

As further shown in FIG. 4, process 400 may include determining, based on the employment-related activity, that the user is likely unemployed (block 460). For example, the income analysis platform (e.g., using processor 320, memory 330, storage component 340, input component 350, output component 360, communication interface 370 and/or the like) may determine, based on the employment-related activity, that the user is likely unemployed, as described above.

As further shown in FIG. 4, process 400 may include performing an action associated with a service of the transaction account in association with the user being likely unemployed (block 470). For example, the income analysis platform (e.g., using processor 320, memory 330, storage component 340, input component 350, output component 360, communication interface 370 and/or the like) may perform an action associated with a service of the transaction account in association with the user being likely unemployed, as described above.

Process 400 may include additional implementations, such as any single implementation or any combination of implementations described below and/or in connection with one or more other processes described elsewhere herein.

In a first implementation, the income analysis platform may receive a user input that authorizes monitoring of the transaction account, and may perform a verification process to verify that the user provided the user input, wherein the transaction log is monitored based on results of performing the verification process.

In a second implementation, alone or in combination with the first implementation, the entity is determined to be associated with a new source of income based on an amount of the income transaction satisfying a threshold and an identifier of the entity.

In a third implementation, alone or in combination with one or more of the first and second implementations, the probability that the employment status changed is determined based on at least one of: an amount of the income transaction, a difference between an amount of the income transaction and an amount of a previous income transaction in the transaction log, a type of the income transaction, or a type of the entity.

In a fourth implementation, alone or in combination with one or more of the first through third implementations, the employment-related activity is analyzed via a machine learning model trained to determine the employment status of the user.

In a fifth implementation, alone or in combination with one or more of the first through fourth implementations, the machine learning model has been trained based on employment-related activity of one or more other users. In some implementations, the machine learning model uses one or more parameters associated with the employment-related activity of the user and historical data associated with income transactions of the transaction log. In some implementations, the one or more parameters include at least one of: a purchase history of the user, a type of online activity of the user, timing of online activity of the user, an amount of online activity of the user that is employment-related, employment-related content of a message account of the user, employment-related social media activity of the user, or information associated with an employer associated with the user.

In a sixth implementation, alone or in combination with one or more of the first through fifth implementations, the income analysis platform may transmit, based on determining that the user is likely unemployed, a communication to the user to request the user to verify that the user is unemployed, wherein the action is performed based on a response from the user in association with the communication.

In a seventh implementation, alone or in combination with one or more of the first through sixth implementations, performing the action comprises at least one of: adjusting the service to reduce an amount of a scheduled transaction involving the transaction account, adjusting the service to extend a due date associated with a scheduled transaction from the transaction account, or monitoring a usage of the service to determine whether to adjust the service.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
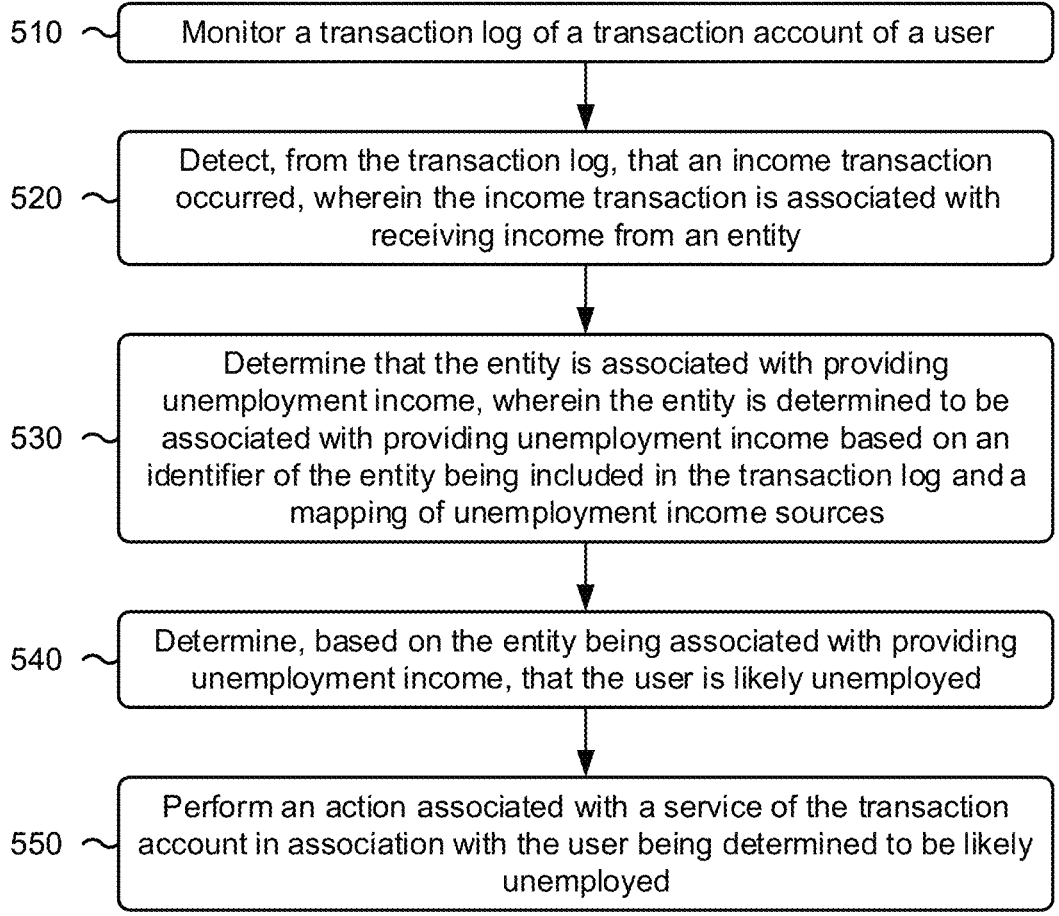

FIG. 5 is a flow chart of an example process 500 associated with employment status detection based on transaction information. In some implementations, one or more process blocks of FIG. 5 may be performed by an income analysis platform (e.g., income analysis platform 210). In some implementations, one or more process blocks of FIG. 5 may be performed by another device or a group of devices separate from or including the income analysis platform, such as a user device (e.g., user device 230), server device (e.g., server device 240), a computing resource (e.g., computing resource 215), and/or the like.

As shown in FIG. 5, process 500 may include monitoring a transaction log of a transaction account of a user (block 510). For example, the income analysis platform (e.g., using processor 320, memory 330, storage component 340, input component 350, output component 360, communication interface 370 and/or the like) may monitor a transaction log of a transaction account of a user, as described above.

As further shown in FIG. 5, process 500 may include detecting, from the transaction log, that an income transaction occurred, wherein the income transaction is associated with receiving income from an entity (block 520). For example, the income analysis platform (e.g., using processor 320, memory 330, storage component 340, input component 350, output component 360, communication interface 370 and/or the like) may detect, from the transaction log, that an income transaction occurred, as described above. In some implementations, the income transaction is associated with receiving income from an entity.

As further shown in FIG. 5, process 500 may include determining that the entity is associated with providing unemployment income, wherein the entity is determined to be associated with providing unemployment income based on an identifier of the entity being included in the transaction log and a mapping of unemployment income sources (block 530). For example, the income analysis platform (e.g., using processor 320, memory 330, storage component 340, input component 350, output component 360, communication interface 370 and/or the like) may determine that the entity is associated with providing unemployment income, as described above. In some implementations, the entity is determined to be associated with providing unemployment income based on an identifier of the entity being included in the transaction log and a mapping of unemployment income sources.

As further shown in FIG. 5, process 500 may include determining, based on the entity being associated with providing unemployment income, that the user is likely unemployed (block 540). For example, the income analysis platform (e.g., using processor 320, memory 330, storage component 340, input component 350, output component 360, communication interface 370 and/or the like) may determine, based on the entity being associated with providing unemployment income, that the user is likely unemployed, as described above.

As further shown in FIG. 5, process 500 may include performing an action associated with a service of the transaction account in association with the user being determined to be likely unemployed (block 550). For example, the income analysis platform (e.g., using processor 320, memory 330, storage component 340, input component 350, output component 360, communication interface 370 and/or the like) may perform an action associated with a service of the transaction account in association with the user being determined to be likely unemployed, as described above.

Process 500 may include additional implementations, such as any single implementation or any combination of implementations described below and/or in connection with one or more other processes described elsewhere herein.

In a first implementation, the transaction log is monitored based on receiving access information, from the user, that authorizes monitoring of the transaction account. In a second implementation, alone or in combination with the first implementation, the entity is determined to be associated with providing unemployment income based on the mapping of unemployment income sources including the identifier of the entity. In a third implementation, alone or in combination with one or more of the first and second implementations, prior to determining that the user is likely unemployed, an analysis is performed to verify that the user is likely unemployed.

In a fourth implementation, alone or in combination with one or more of the first through third implementations, the analysis is performed using a machine learning model that has been trained based on one or more parameters associated with the employment-related activity or associated with the user and historical data associated with income transactions of the transaction log. In a fifth implementation, alone or in combination with one or more of the first through fourth implementations, the income analysis platform may transmit, based on determining that the user is likely unemployed, a communication to the user to request the user to verify that the user is unemployed.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
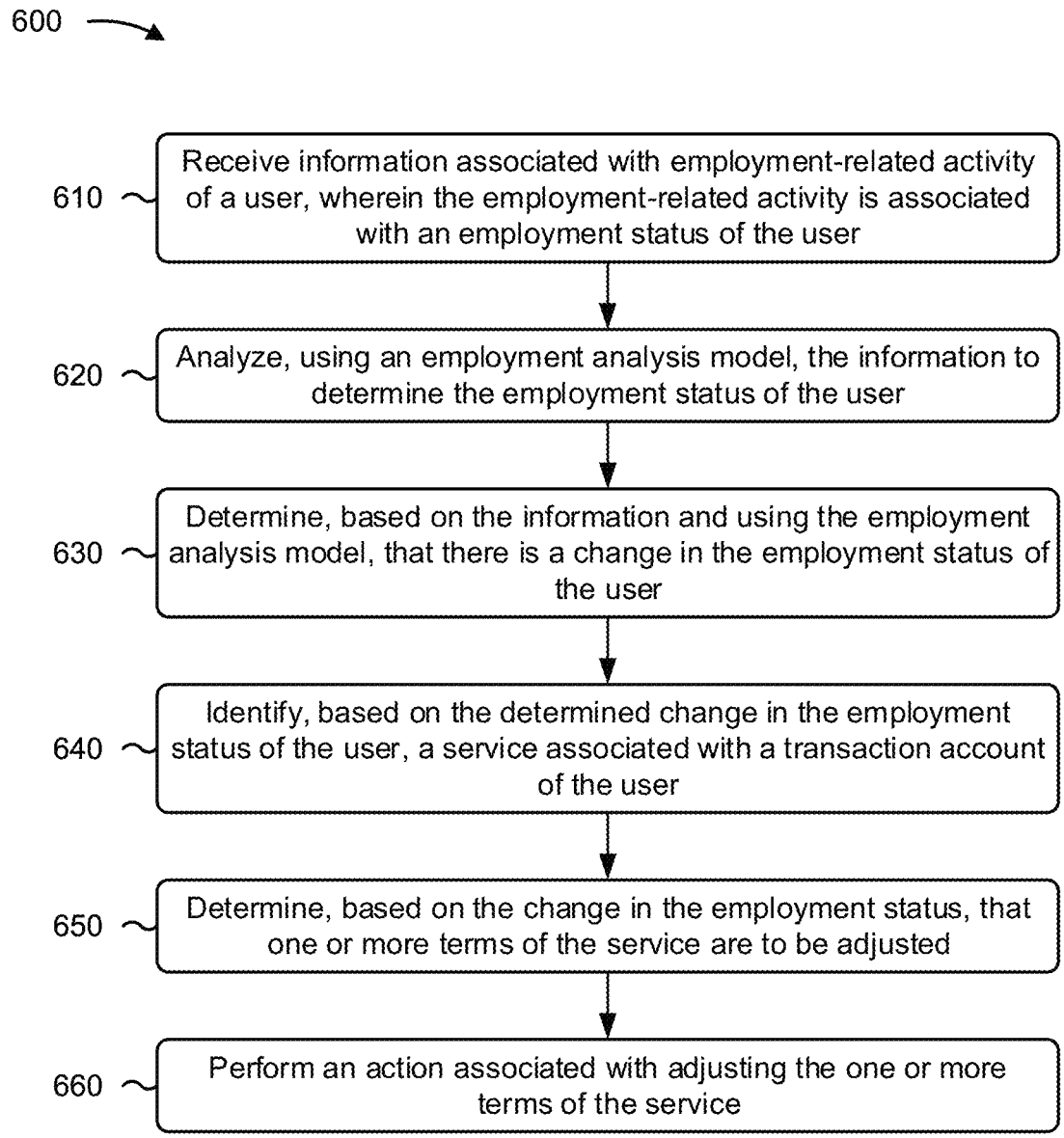

FIG. 6 is a flow chart of an example process 600 associated with employment status detection based on transaction information. In some implementations, one or more process blocks of FIG. 6 may be performed by an income analysis platform (e.g., income analysis platform 210). In some implementations, one or more process blocks of FIG. 6 may be performed by another device or a group of devices separate from or including the income analysis platform, such as a user device (e.g., user device 230), server device (e.g., server device 240), a computing resource (e.g., computing resource 215), and/or the like.

As shown in FIG. 6, process 600 may include receiving information associated with employment-related activity of a user, wherein the employment-related activity is associated with an employment status of the user (block 610). For example, the income analysis platform (e.g., using processor 320, memory 330, storage component 340, input component 350, output component 360, communication interface 370 and/or the like) may receive information associated with employment-related activity of a user, as described above. In some implementations, the employment-related activity is associated with an employment status of the user.

As further shown in FIG. 6, process 600 may include analyzing, using an employment analysis model, the information to determine the employment status of the user (block 620). For example, the income analysis platform (e.g., using processor 320, memory 330, storage component 340, input component 350, output component 360, communication interface 370 and/or the like) may analyze, using an employment analysis model, the information to determine the employment status of the user, as described above.

As further shown in FIG. 6, process 600 may include determining, based on the information and using the employment analysis model, that there is a change in the employment status of the user (block 630). For example, the income analysis platform (e.g., using processor 320, memory 330, storage component 340, input component 350, output component 360, communication interface 370 and/or the like) may determine, based on the information and using the employment analysis model, that there is a change in the employment status of the user, as described above.

As further shown in FIG. 6, process 600 may include identifying, based on the determined change in the employment status of the user, a service associated with a transaction account of the user (block 640). For example, the income analysis platform (e.g., using processor 320, memory 330, storage component 340, input component 350, output component 360, communication interface 370 and/or the like) may identify, based on the determined change in the employment status of the user, a service associated with a transaction account of the user, as described above.

As further shown in FIG. 6, process 600 may include determining, based on the change in the employment status, that one or more terms of the service are to be adjusted (block 650). For example, the income analysis platform (e.g., using processor 320, memory 330, storage component 340, input component 350, output component 360, communication interface 370 and/or the like) may determine, based on the change in the employment status, that one or more terms of the service are to be adjusted, as described above.

As further shown in FIG. 6, process 600 may include performing an action associated with adjusting the one or more terms of the service (block 660). For example, the income analysis platform (e.g., using processor 320, memory 330, storage component 340, input component 350, output component 360, communication interface 370 and/or the like) may perform an action associated with adjusting the one or more terms of the service, as described above.

Process 600 may include additional implementations, such as any single implementation or any combination of implementations described below and/or in connection with one or more other processes described elsewhere herein.

In a first implementation, the employment analysis model comprises a machine learning model trained to determine the employment status of the user.

In a second implementation, alone or in combination with the first implementation, the employment analysis model is configured to detect the change in the employment status based on a transaction log that is included in the information. In some implementations, the transaction log is associated with the transaction account and includes at least one of: an amount of an income transaction, an entity associated with the income transaction, a difference between an amount of the income transaction and an amount of a previous income transaction in the transaction log, a type of the income transaction, or a type of the entity.

In a third implementation, alone or in combination with one or more of the first and second implementations, the employment-related activity includes at least one of: income transactions in a transaction log of the transaction account, a purchase history of the user, a type of online activity of the user, timing of online activity of the user, an amount of online activity of the user that is employment-related, content of a message account of the user, employment-related social media activity of the user, or information associated with an employer associated with the user.

In a fourth implementation, alone or in combination with one or more of the first through third implementations, the change in the employment status indicates that the user is likely unemployed, the action is performed to at least one of: reduce a scheduled transaction amount from the transaction account, extend a due date associated with a scheduled transaction from the transaction account, or monitor a usage of the service to determine whether to adjust the terms of the service.

In a fifth implementation, alone or in combination with one or more of the first through fourth implementations, when the change in the employment status indicates that the user has a new employer, the action is performed to at least one of: offer an adjustment to the one or more terms of the service for the user.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   monitoring, by a device and based on receiving access information, a transaction log of a transaction account of a user;
   detecting, by the device and from the transaction log, that an income transaction occurred,
      wherein the income transaction is associated with receiving income from an entity;
   determining, by the device, that the entity is associated with a new source of income;
   determining, by the device and based on the entity being associated with the new source of income, a probability that an employment status of the user has changed;
   training, by the device, a machine learning model using historical data and one or more parameters to determine an employment status of a particular user based on whether a particular employment-related activity is associated with being employed or unemployed;
   analyzing, by the device and based on the probability that the employment status has changed, employment-related activity associated with the user to determine whether the user is likely unemployed,
      where analyzing the employment-related activity associated with the user comprises:
         determining, using the machine learning model and the employment-related activity associated with the user, a score that indicates a likelihood that the user is unemployed;
   determining, by the device and based on the employment-related activity, that the user is likely unemployed; and
   performing, by the device, an action associated with a service of the transaction account in association with the user being likely unemployed.

2. The method of claim 1, further comprising:
   receiving a user input that authorizes monitoring of the transaction account; and
   performing a verification process to verify that the user provided the user input,
      wherein the transaction log is monitored based on results of performing the verification process.

3. The method of claim 1, wherein the entity is determined to be associated with the new source of income based on an amount of the income transaction satisfying a threshold and an identifier of the entity.

4. The method of claim 1, wherein the probability that the employment status changed is determined based on at least one of:
   an amount of the income transaction,
   a difference between an amount of the income transaction and an amount of a previous income transaction in the transaction log,
   a type of the income transaction, or
   a type of the entity.

5. The method of claim 1,
   wherein the one or more parameters include at least one of:
      a purchase history of the user,
      a type of online activity of the user,
      timing of online activity of the user,
      an amount of online activity of the user that is employment-related,
      employment-related content of a message account of the user,
      employment-related social media activity of the user, or
      information associated with an employer associated with the user.

6. The method of claim 1, further comprising:
   transmitting, based on determining that the user is likely unemployed, a communication to the user to request the user to verify that the user is unemployed,
      wherein the action is performed based on a response from the user in association with the communication.

7. The method of claim 1, wherein performing the action comprises at least one of:
   adjusting the service to reduce an amount of a scheduled transaction involving the transaction account,
   adjusting the service to extend a due date associated with a scheduled transaction from the transaction account, or
   monitoring a usage of the service to determine whether to adjust the service.

8. A non-transitory computer-readable medium storing instructions, the instructions comprising:
   one or more instructions that, when executed by one or more processors, cause the one or more processors to:
      receive information associated with employment-related activity of a user,
         wherein the employment-related activity is associated with an employment status of the user;
      train an employment analysis model using historical data and one or more parameters to determine a change in employment status of a particular user based on whether a particular employment-related activity is associated with being employed or unemployed,
         the employment analysis model being a machine learning model;
      analyze, using the employment analysis model, the information to determine the employment status of the user,
         wherein the one or more instructions, when executed by the one or more processors to analyze the employment-related activity, cause the one or more processor to:
            determine, using the employment analysis model and the information associated with the user, a score that indicates a likelihood the employment status of the user has changed;
determine, based on the information and using the employment analysis model, that there is a change in the employment status of the user;
identify, based on the determined change in the employment status of the user, a service associated with a transaction account of the user;
determine, based on the change in the employment status, that one or more terms of the service are to be adjusted; and
perform an action associated with adjusting the one or more terms of the service.

9. The non-transitory computer-readable medium of claim 8, wherein the employment analysis model is configured to detect the change in the employment status based on a transaction log that is included in the information, and
wherein the transaction log is associated with the transaction account and includes at least one of:
an amount of an income transaction,
an entity associated with the income transaction,
a difference between an amount of the income transaction and an amount of a previous income transaction in the transaction log,
a type of the income transaction, or
a type of the entity.

10. The non-transitory computer-readable medium of claim 8, wherein the employment-related activity includes at least one of:
income transactions in a transaction log of the transaction account,
a purchase history of the user,
a type of online activity of the user,
timing of online activity of the user,
an amount of online activity of the user that is employment-related,
content of a message account of the user,
employment-related social media activity of the user, or
information associated with an employer associated with the user.

11. The non-transitory computer-readable medium of claim 8, wherein the change in the employment status indicates that the user is likely unemployed,
wherein the action is performed to at least one of:
reduce a scheduled transaction amount from the transaction account,
extend a due date associated with a scheduled transaction from the transaction account, or
monitor a usage of the service to determine whether to adjust the terms of the service.

12. The non-transitory computer-readable medium of claim 8, wherein the change in the employment status indicates that the user has a new employer,
wherein the action is performed to offer an adjustment to the one or more terms of the service for the user.

13. A device, comprising:
one or more memories; and
one or more processors communicatively coupled to the one or more memories, configured to:
monitor, based on receiving access information, a transaction log of a transaction account of a user;
detect, from the transaction log, that an income transaction occurred,
wherein the income transaction is associated with receiving income from an entity;
determine that the entity is associated with a new source of income;
determine, based on the entity being associated with the new source of income, a probability that an employment status of the user has changed;
train a machine learning model using historical data and one or more parameters to determine an employment status of a particular user based on whether a particular employment-related activity is associated with being employed or unemployed;
analyze, based on the probability that the employment status has changed, employment-related activity associated with the user to determine whether the user is likely unemployed,
where the one or more processors, when analyzing the employment-related activity, are to:
determine, using the machine learning model and the employment-related activity associated with the user, a score that indicates a likelihood that the user is unemployed;
determine, based on the employment-related activity, that the user is likely unemployed; and
perform an action associated with a service of the transaction account in association with the user being likely unemployed.

14. The device of claim 13, wherein the one or more processors are further configured to:
receive a user input that authorizes monitoring of the transaction account; and
perform verification process to verify that the user provided the user input,
wherein the transaction log is monitored based on results of performing the verification process.

15. The device of claim 13, wherein the entity is determined to be associated with the new source of income based on an amount of the income transaction satisfying a threshold and an identifier of the entity.

16. The device of claim 13, wherein the probability that the employment status changed is determined based on at least one of:
an amount of the income transaction,
a difference between an amount of the income transaction and an amount of a previous income transaction in the transaction log,
a type of the income transaction, or
a type of the entity.

17. The device of claim 13, wherein the one or more processors are further configured to:
transmit, based on determining that the user is likely unemployed, a communication to the user to request the user to verify that the user is unemployed,
wherein the action is performed based on a response from the user in association with the communication.

18. The device of claim 13, wherein the one or more processors when performing the action are to at least one of:
adjust the service to reduce an amount of a scheduled transaction involving the transaction account,
adjust the service to extend a due date associated with a scheduled transaction from the transaction account, or
monitor a usage of the service to determine whether to adjust the service.

19. The method of claim 1, further comprising:
receiving the access information,
wherein the access information includes at least one set of credentials associated with an account of the user.

20. The non-transitory computer-readable medium of claim 8, wherein the one or more instructions, when executed by the one or more processors, further cause the one or more processors to:

receive access information,
   wherein the access information includes at least one set of credentials associated with an account of the user.

\* \* \* \* \*